(12) United States Patent
Nagatoshi et al.

(10) Patent No.: US 12,164,088 B2
(45) Date of Patent: Dec. 10, 2024

(54) PROJECTION LENS AND PROJECTION APPARATUS

(71) Applicant: FUJIFILM Corporation, Tokyo (JP)

(72) Inventors: Yukiko Nagatoshi, Saitama (JP); Masao Mori, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 304 days.

(21) Appl. No.: 17/734,497

(22) Filed: May 2, 2022

(65) Prior Publication Data

US 2022/0269052 A1 Aug. 25, 2022

Related U.S. Application Data

(63) Continuation of application No. PCT/JP2020/041982, filed on Nov. 10, 2020.

(30) Foreign Application Priority Data

Nov. 15, 2019 (JP) .................................. 2019-207495

(51) Int. Cl.
  *G02B 13/16* (2006.01)
  *G03B 21/00* (2006.01)
  (Continued)

(52) U.S. Cl.
  CPC ........... *G02B 13/16* (2013.01); *G03B 21/005* (2013.01); *G03B 21/28* (2013.01); *G02B 27/0101* (2013.01)

(58) Field of Classification Search
  CPC .. G03B 21/005; G03B 21/006; G03B 21/008; G03B 21/28; G03B 21/142;
  (Continued)

(56) References Cited

U.S. PATENT DOCUMENTS 6,457,834 B1 * 10/2002 Cotton ............... G02B 27/0025
  353/69
2004/0233394 A1 * 11/2004 Gohman ................ G03B 21/28
  348/E5.143
(Continued)

FOREIGN PATENT DOCUMENTS

JP  2005-128286 A  5/2005
JP  2007-86274 A  4/2007
(Continued)

OTHER PUBLICATIONS

Japanese Notice of Reasons for Refusal for corresponding Japanese Application No. 2021-556111, dated Oct. 4, 2022, with an English translation.
(Continued)

*Primary Examiner* — Sultan Chowdhury
(74) *Attorney, Agent, or Firm* — Birch, Stewart, Kolasch & Birch, LLP

(57) ABSTRACT

A projection lens having an optical system includes: an incidence lens on which light from an electrooptic element is incident; and an emission lens positioned closest to a magnification side and emits an image toward a projection surface, in which an incidence optical axis of the incidence lens is shifted in a first direction orthogonal to the incidence optical axis with respect to a center of a screen of the electrooptic element, a projection angle, which is an angle of an emission optical axis of the emission lens with respect to the projection surface, is less than 90°, and assuming an effective diameter of the emission lens is DE, a focal length of an entire optical system including the emission lens is f, and a half angle of view of the entire optical system is $\omega$, $\omega$ is $\geq 60°$, and a value of PA defined by Expression (1)$\geq 0.1$ and $\geq 7$. PA=DE/(f×tan $\omega$) (1).

16 Claims, 31 Drawing Sheets

(51) Int. Cl.
*G03B 21/28* (2006.01)
*G02B 27/01* (2006.01)

(58) Field of Classification Search
CPC .... G03B 21/147; G03B 21/208; G02B 17/00; G02B 17/002; G02B 17/004; G02B 17/023; G02B 13/16; G02B 13/18; G02B 13/22; G02B 13/24; G02B 13/26
See application file for complete search history.

(56) References Cited

U.S. PATENT DOCUMENTS

| | | | |
|---|---|---|---|
| 2005/0088762 A1 | 4/2005 | Ohashi | |
| 2010/0165308 A1* | 7/2010 | Morikuni | G03B 21/145 353/98 |
| 2013/0083298 A1* | 4/2013 | Yoshimura | H04N 9/3185 353/121 |
| 2016/0246037 A1* | 8/2016 | Amano | G02B 13/22 |
| 2017/0059971 A1* | 3/2017 | Takano | G02B 17/08 |
| 2018/0217489 A1 | 8/2018 | Kuroda | |
| 2019/0086783 A1 | 3/2019 | Kuroda | |
| 2019/0101816 A1 | 4/2019 | Kuroda | |
| 2019/0154992 A1 | 5/2019 | Amano et al. | |
| 2019/0285972 A1* | 9/2019 | Minefuji | G03B 21/142 |
| 2020/0050096 A1 | 2/2020 | Kuroda | |
| 2020/0301267 A1 | 9/2020 | Kuroda | |
| 2021/0247681 A1 | 8/2021 | Kuroda | |

FOREIGN PATENT DOCUMENTS

| | | |
|---|---|---|
| JP | 6378448 B2 | 8/2018 |
| JP | 2018-138944 A | 9/2018 |
| JP | 2018-138945 A | 9/2018 |
| JP | 2019-95788 A | 6/2019 |

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2020/041982, dated May 27, 2022.
International Search Report (Form PCT/ISA/210) for International Application No. PCT/JP2020/041982, dated Jan. 19, 2021, with English translation.

* cited by examiner

EXAMPLE 1A

EXAMPLE 1B

EXAMPLE 2A

EXAMPLE 2B

EXAMPLE 3A

COMPARATIVE EXAMPLE

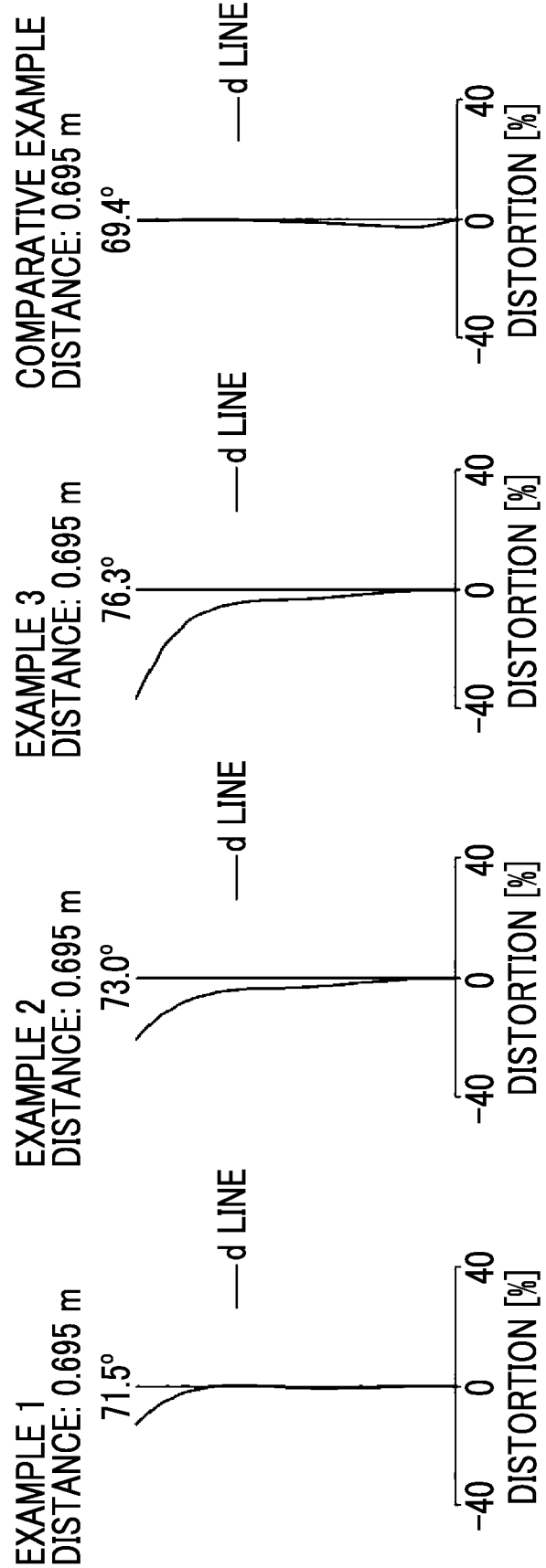

EXAMPLE 1

PROJECTION ANGLE 90°

PROJECTION ANGLE 85°

EXAMPLE 2

PROJECTION ANGLE 90°

PROJECTION ANGLE 85°

EXAMPLE 3

PROJECTION ANGLE 90°

PROJECTION ANGLE 85°

PROJECTION ANGLE 85°

COMPARATIVE EXAMPLE

PROJECTION ANGLE 90°

PROJECTION ANGLE 85°

PROJECTION LENS AND PROJECTION APPARATUS

CROSS-REFERENCE TO RELATED APPLICATION

This application is a continuation application of International Application No. PCT/JP2020/041982, filed Nov. 10, 2020, the disclosure of which is incorporated herein by reference in its entirety. Further, this application claims priority from Japanese Patent Application No. 2019-207495 filed on Nov. 15, 2019, the disclosure of which is incorporated herein by reference in its entirety.

BACKGROUND

1. Technical Field

The techniques of the present disclosure relate to a projection lens and a projection apparatus.

2. Description of the Related Art

The projection apparatus described in Japanese Patent No. 6378448B includes a projection lens having an optical path which is U-shaped as a whole by deflecting the optical axis twice. The projection lens comprises a first optical system, a second optical system, a third optical system, a first mirror, and a second mirror. The first mirror deflects the first optical axis of the first optical system and reflects light toward the second optical system. The second mirror deflects the second optical axis of the second optical system and reflects light toward the third optical system.

SUMMARY

The technique of the present disclosure provides a projection lens and a projection apparatus capable of suppressing both an increase in size and distortion even at a wide angle of view.

According to an aspect of the technique of the present disclosure, there is provided a projection lens having an optical system comprising: an incidence lens on which light from an electrooptic element is incident; and an emission lens that is positioned closest to a magnification side and emits an image toward a projection surface, in which an incidence optical axis of the incidence lens is shifted in a first direction orthogonal to the incidence optical axis with respect to a center of a screen of the electrooptic element, a projection angle, which is an angle of an emission optical axis of the emission lens with respect to the projection surface, is less than 90°, and assuming that an effective diameter of the emission lens is DE, a focal length of an entire optical system including the emission lens is f, and a half angle of view of the entire optical system is ω, ω is equal to or greater than 60°, and a value of PA defined by Expression (1) is equal to or greater than 0.1 and equal to or less than 7.

$$PA = DE/(f \times \tan \omega) \tag{1}$$

It is preferable that the value of PA is equal to or greater than 0.5 and equal to or less than 7.

It is preferable that the value of PA is equal to or greater than 1 and equal to or less than 5.

It is preferable that the projection surface is convex in a projection direction.

It is preferable that in a case where, among straight lines connecting both ends of each side of two opposite sides of the image projected on the projection surface in the first direction, a length of a longer straight line is XL, a length of a shorter straight line is XS, and XL/XS, which is a ratio of XL to XS, is a distortion ratio, assuming that the distortion ratio is PD1 in a case where the projection angle is 90°, and the distortion ratio is PD2 in a case where the projection angle is 85°, values of PD1 and PD2 satisfy Conditional Expression (2).

$$PD1 > PD2 \tag{2}$$

Further, it is preferable that the values of PD1 and PD2 satisfy Conditional Expression (2-1).

$$PD1 - PD2 \geq 0.05 \tag{2-1}$$

Further, it is preferable that the value of PD2 satisfies Conditional Expression (3).

$$PD2 \leq 1.2 \tag{3}$$

It is preferable that the projection lens further comprises a reflecting part that deflects an optical axis, in which the reflecting part deflects the optical axis on an incidence side of the reflecting part toward the emission optical axis.

It is preferable that the emission optical axis is tilted by rotating the reflecting part.

It is preferable that assuming that a length of the screen of the electrooptic element in the first direction is V1, a maximum amount of shift of the incidence optical axis with respect to a center position of the screen is V2, a projection distance between the emission lens and the projection surface is LP, a dimensionless value of LP is LPn, and a tilt angle of the emission optical axis with respect to a horizontal direction is α in a case where the emission lens is seen in a side view, a value of PS defined by Expression (4) satisfies Conditional Expression (5).

$$PS = 100 \times V2/V1 \tag{4}$$

$$35 - 3.5 \times LPn \times \alpha < PS < 70 - LPn \times \alpha \tag{5}$$

It is preferable that PS satisfies Conditional Expression (5-1).

$$40 - 2.5 \times Ln \times \alpha < PS < 60 - 1.5 \times Ln \times \alpha \tag{5-1}$$

According to an aspect of the technique of the present disclosure, there is provided a projection lens having an optical system comprising: an incidence lens on which light from an electrooptic element is incident; and an emission lens that is positioned closest to a magnification side and emits an image toward a projection surface, in which an incidence optical axis of the incidence lens is shifted in a first direction orthogonal to the incidence optical axis with respect to a center of a screen of the electrooptic element, and assuming that a length of the screen of the electrooptic element in the first direction is V1, a maximum amount of shift of the incidence optical axis with respect to a center position of the screen is V2, a projection distance between the emission lens and the projection surface is LP, a dimensionless value of LP is LPn, and a tilt angle of an emission optical axis of the emission lens with respect to a horizontal direction is α in a case where the emission lens is seen in a side view, a value of PS defined by Expression (4) satisfies Conditional Expression (5).

$$PS = 100 \times V2/V1 \tag{4}$$

$$35 - 3.5 \times LPn \times \alpha < PS < 70 - LPn \times \alpha \tag{5}$$

It is preferable that PS satisfies Conditional Expression (5-1).

$$40-2.5 \times Ln \times \alpha < PS < 60-1.5 \times Ln \times \alpha \quad (5\text{-}1)$$

According to an aspect of the technique of the present disclosure, there is provided a projection lens comprising: an optical system that includes an incidence lens on which light from an electrooptic element is incident, and an emission lens that is positioned closest to a magnification side and emits an image toward a projection surface; and a reflecting part that has a reflective surface which deflects an optical axis of light incident from an incidence lens side and emits the light to an emission lens side, in which assuming that a tilt angle of an emission optical axis of the emission lens with respect to a horizontal direction is $\alpha$ in a case where the emission lens is seen in a side view, and an inclination angle of the reflective surface with respect to the horizontal direction is $\gamma$, Conditional Expression (6) is satisfied.

$$\gamma - 45° = \alpha/2 \quad (6)$$

The projection apparatus according to the aspects of the technique of the present disclosure comprises a projection lens having the above-mentioned characteristics.

BRIEF DESCRIPTION OF THE DRAWINGS

Exemplary embodiments according to the technique of the present disclosure will be described in detail based on the following figures, wherein:

FIGS. 18A, 18B, 18C, and 18D are distortion diagrams of examples and comparative examples.

DETAILED DESCRIPTION

Hereinafter, examples of embodiments of the technique of the present disclosure will be described, with reference to the drawings. The terms such as "first", "second", and "third" used in the present specification are referenced to avoid confusion of the components, and does not limit the number of components which are present in the projection lens or the projection apparatus.

In the description herein, the terms "parallel" or "horizontal" respectively indicate not only perfectly parallel or perfectly horizontal, but also substantially parallel or substantially horizontal including generally tolerable errors in the technical field to which the techniques of the present disclosure belong.

First Embodiment

Figure 1:
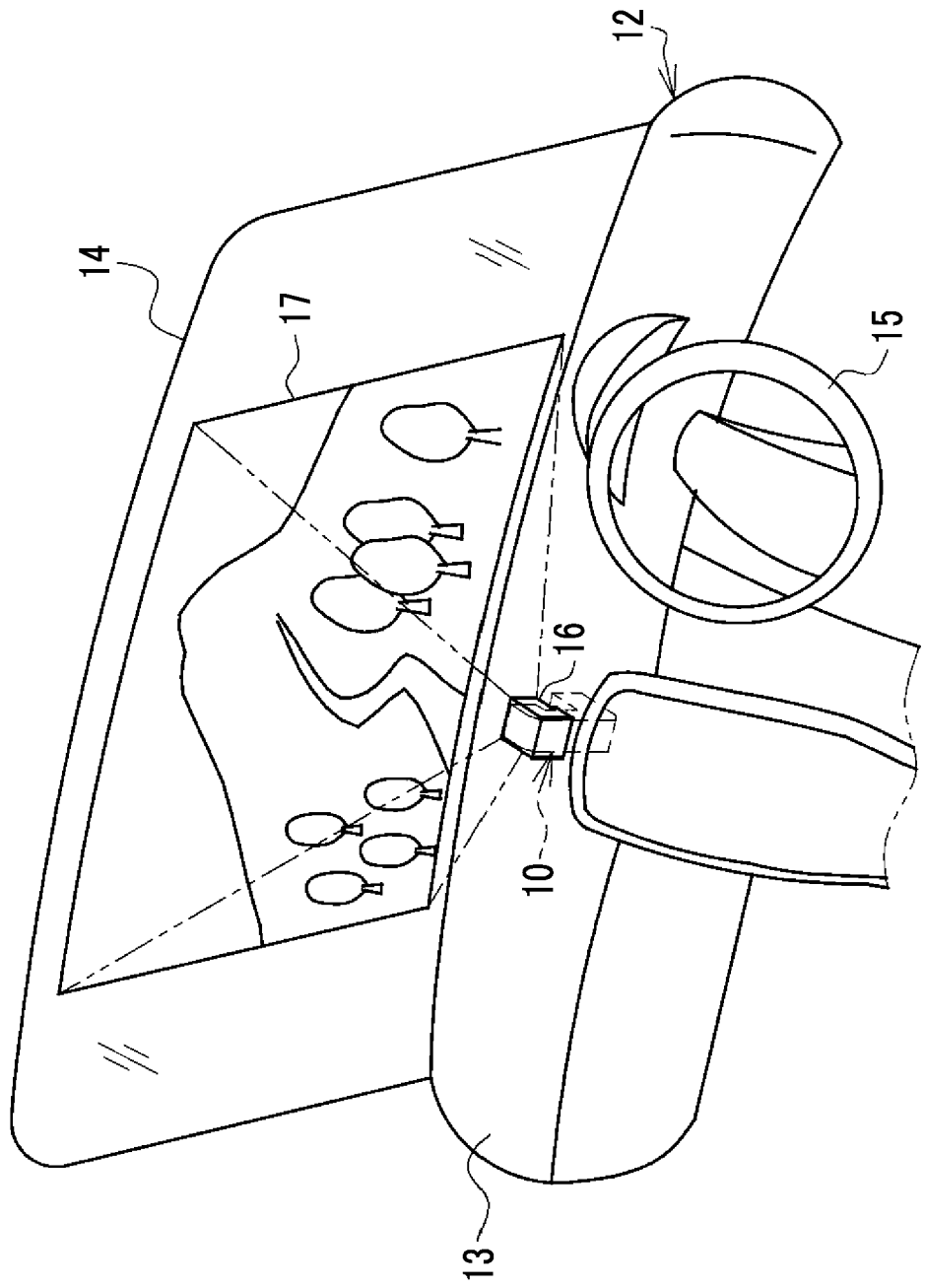
FIG. 1 is a diagram illustrating an example of a state in which an image is projected onto a windshield from a projection lens incorporated into a dashboard of an automobile.
Figure 2:
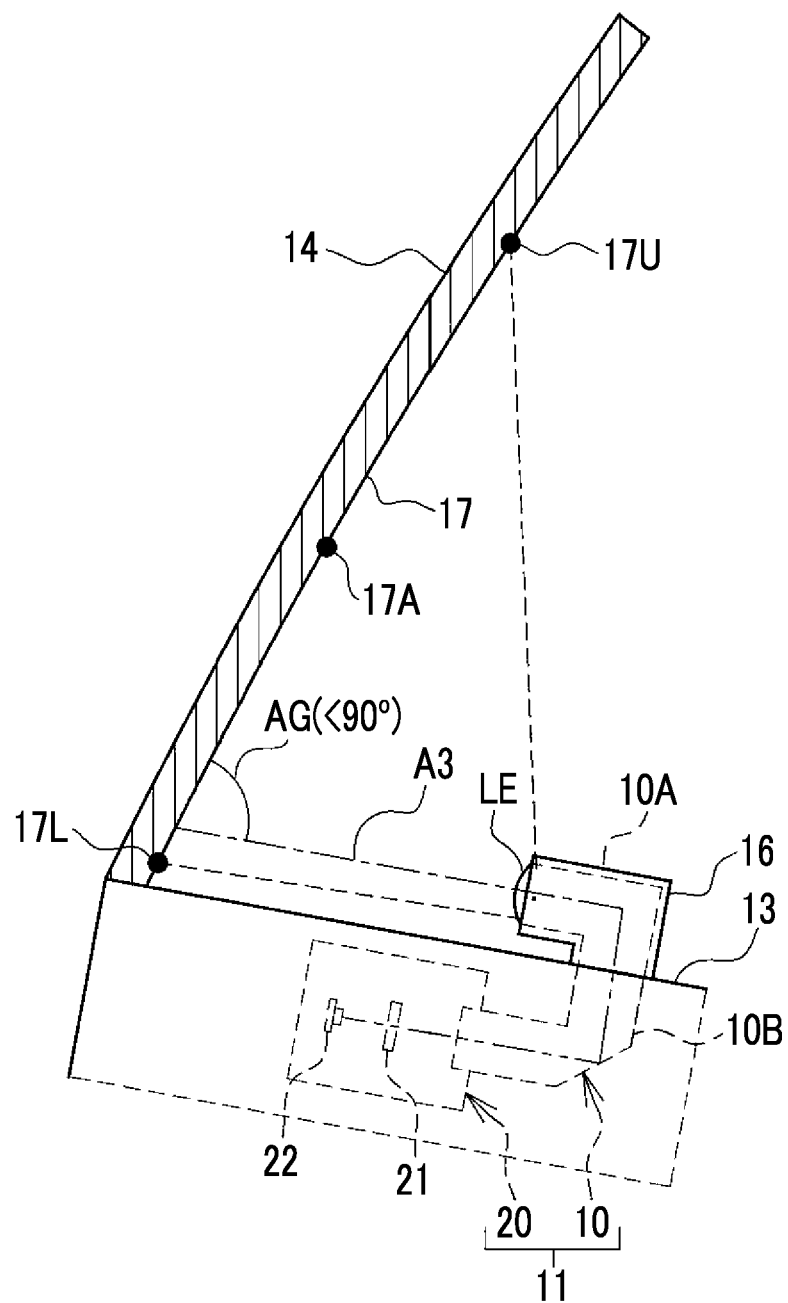
FIG. 2 is a diagram illustrating an example of a projection apparatus including the projection lens and an electrooptic unit.

For example, as shown in FIGS. 1 and 2, a projection lens 10 is incorporated into a projection apparatus 11. The projection apparatus 11 according to the technique of the present disclosure is for transportation equipment as an example, and is provided on a dashboard 13 of an automobile 12 which is an example of a transportation equipment. A part of the projection lens 10 in the projection apparatus 11 is exposed from an upper part of the dashboard 13, for example. The projection apparatus 11 projects an image 17 onto a windshield 14 of the automobile 12 as an example through the projection lens 10. The image 17 is a projected image projected on the windshield 14 by the projection lens 10.

For example, the projection apparatus 11 projects the image 17 onto the windshield 14 while the automobile 12 is stopped. Further, in a case where automatic driving of the automobile 12 is possible in the future, the projection apparatus 11 may project the image 17 onto the windshield 14 during the automatic driving. The automatic driving refers to driving in which the gas pedal, the brake, the turn indicator, the steering wheel 15, and the like, which are necessary for driving the automobile, are autonomously operated by the control device (not shown in the drawing) provided in the automobile 12.

As shown in FIG. 2, the projection lens 10 is roughly classified into an emission side part 10A and an incidence side part 10B as an example. In the present example, the projection lens 10 is provided on the dashboard 13 in a posture in which the emission side part 10A is positioned in the upper part and the incidence side part 10B is positioned in the lower part. The upper side of the projection lens 10 which is the emission side part 10A is exposed from the dashboard 13. Further, the lower side of the projection lens 10 which is the incidence side part 10B is accommodated in the dashboard 13. The emission side part 10A of the projection lens 10 is covered with a cover 16. The cover 16 is formed of, for example, the same material as the dashboard 13.

In the incidence side part 10B of the projection lens 10, an electrooptic unit 20 is connected to an end part on the incidence side on which light is incident. The electrooptic unit 20 and the projection lens 10 constitute the projection apparatus 11. The projection lens 10 magnifies an image formed by the electrooptic unit 20 and projects the image onto the windshield 14 which is an example of the projection surface. An emission lens LE is disposed at the emission end of the optical path of the emission side part 10A of the projection lens 10. The emission lens LE is positioned closest to the magnification side of the optical system of the projection lens 10, and emits the image 17 toward the windshield 14 (an example of the projection surface).

As shown in FIG. 2, the projection lens 10 projects the image 17 from the dashboard 13 onto the windshield 14. Therefore, a projection distance LP (refer to FIG. 4) is about several tens of centimeters. Further, the projection lens 10 projects the image 17 throughout a wide range in the vertical direction and the width direction of the windshield 14. For this reason, the projection lens 10 is necessary to have optical performance of a short focus and a wide angle as compared with a projection lens used in a general projection apparatus for indoor use.

Further, as shown in FIG. 2, a center 17A of the image 17 projected by the projection lens 10 (refer to also FIGS. 5 and 6) does not coincide with the emission optical axis (third optical axis A3 in the present example) of the emission lens LE. That is, the projection lens 10 projects the image 17 by a so-called launch system in which the center 17A of the projected image 17 is positioned above the emission optical axis (third optical axis A3) by the lens shift function to be described later. The projection lens 10 projects the image 17 onto the windshield 14 such that a point on the extension line of the emission optical axis (third optical axis A3) of the emission lens LE coincides with the lower side 17L of the image 17, and is able to perform so-called zero offset projection. The windshield 14, which is the projection surface of the image 17, extends above the dashboard 13 on which the projection lens 10 is provided. For this reason, by projecting the image 17 by the launch system as in the present example, it is possible to prevent the lower part of the image 17 from being blocked by the dashboard 13.

The electrooptic unit 20 forms an image projected onto the windshield 14 through the projection lens 10. The electrooptic unit 20 includes an electrooptic element 21, a light source 22, a light guide member (not shown in the drawing), and the like. The light source 22 irradiates the electrooptic element 21 with light. The light guide member guides the light from the light source 22 into the electrooptic element 21.

For example, the electrooptic unit 20 is a reflective type using a digital micromirror device (DMD: registered trademark) as the electrooptic element 21. The DMD has a plurality of micromirrors capable of changing the reflection direction of the light which is emitted from the light source 22, and is an electrooptic element in which the micromirrors are arranged two-dimensionally on a pixel-by-pixel basis. The DMD performs optical modulation according to the image by switching on/off of the reflected light of the light from the light source 22 by changing the direction of each micromirror in accordance with the image. The electrooptic element 21 is an example of an "electrooptic element" according to the technique of the present disclosure.

An example of the light source 22 is a white light source which emits white light. The white light source is implemented, for example, by combining a laser light source and a phosphor. Specifically, the laser light source emits blue light as excitation light for the phosphor. The phosphor excited by the blue light which is emitted from the laser light source emits yellow light. The white light source emits white light by combining blue light which is emitted from a laser light source and yellow light which is emitted from a phosphor. The electrooptic unit 20 is further provided with a rotatable color filter which selectively converts the white light which is emitted by the light source 22 into blue light, green light, and red light in a time-divided manner. By selectively irradiating the electrooptic element 21 with the blue, green, and red color lights, image light carrying the image information of the blue, green, and red colors can be obtained. The image light of each color obtained in such a manner is selectively incident onto the projection lens 10 and is projected toward the windshield 14. The image light of each color is integrated on the windshield 14. As a result, the image 17 which is chromatic or achromatic is displayed on the windshield 14.

A luminous flux, which represents an image formed by the electrooptic unit 20, is incident onto the projection lens 10 from the electrooptic unit 20. The projection lens 10 magnifies and forms an image of image light based on the incident luminous flux. Thereby, the projection lens 10 projects the image 17, which is a magnified image of the image formed by the electrooptic unit 20, onto the windshield 14.

The projection lens 10 is provided such that the projection angle, which is an angle of the emission optical axis (third optical axis A3 in the present example) with respect to the windshield 14 (an example of the projection surface) of the emission lens LE, is less than 90°. In FIG. 2, the reference sign AG indicates a projection angle, and "AG<90°" indicates that the projection angle is less than 90°. In a case where the windshield 14 has a curved surface, the projection angle is an angle between the third optical axis A3 and a tangent of the intersection of the windshield 14 and the third optical axis A3 which is the emission optical axis.

Figure 3:
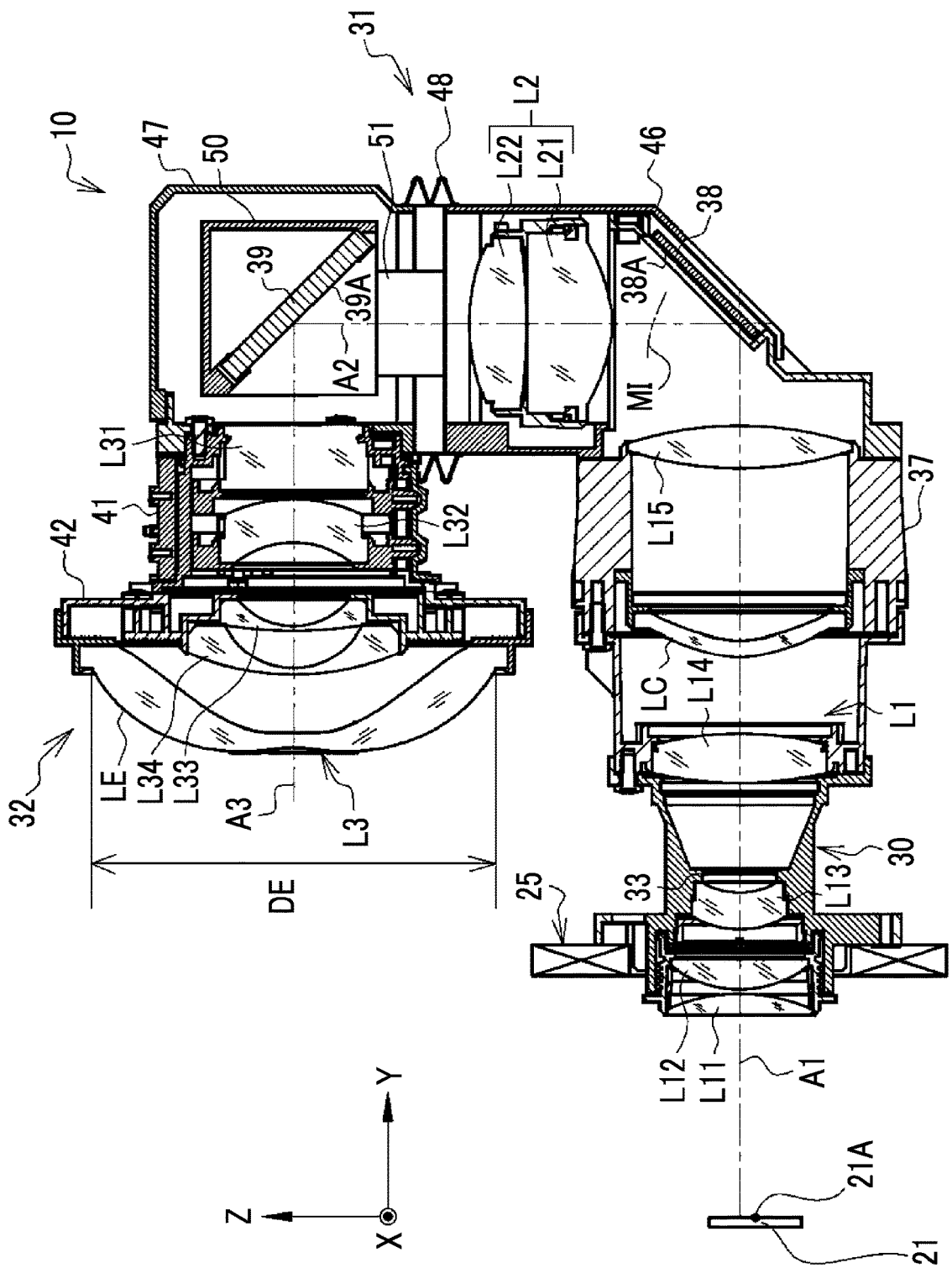
FIG. 3 is a cross-sectional view of an example of the projection lens.

For example, as shown in FIG. 3, the projection lens 10 includes a deflecting optical system. The deflecting optical system has a first optical axis A1, a second optical axis A2, and a third optical axis A3. The first optical axis A1 is an optical axis through which light from the electrooptic unit 20 passes. The second optical axis A2 is an optical axis deflected by 90° with respect to the first optical axis A1. The third optical axis A3 is an optical axis deflected by 90° with respect to the second optical axis A2. For this reason, the first optical axis A1 and the third optical axis A3 are parallel to each other. It should be noted that 90° here is a value including an error allowed in the design. The third optical axis A3 is also referred to as the emission optical axis as described above. Further, in the following description, the optical axis of the projection lens 10 may be generically referred to as an optical axis A without distinguishing between the first optical axis A1, the second optical axis A2, and the third optical axis A3.

In the following description, a direction parallel to the first optical axis A1 and the third optical axis A3 is represented as the Y direction, a direction parallel to the second optical axis A2 is represented as the Z direction, and a direction orthogonal to the Y direction and the Z direction is represented as the X direction.

The projection lens 10 has a first lens barrel unit 30, a second lens barrel unit 31, and a third lens barrel unit 32. The first lens barrel unit 30 is positioned closest to the incidence side, and the third lens barrel unit 32 is positioned closest to the emission side. The second lens barrel unit 31 is positioned between the first lens barrel unit 30 and the third lens barrel unit 32. The lens barrel units 30 to 32 each hold a lens. The lens held in the first lens barrel unit 30 is disposed on the first optical axis A1. Further, the lens held in the second lens barrel unit 31 is disposed on the second optical axis A2. Further, the lens held in the third lens barrel unit 32 is disposed on the third optical axis A3.

A central axis of the first lens barrel unit 30 substantially coincides with the first optical axis A1. Further, a central axis of the second lens barrel unit 31 substantially coincides with the second optical axis A2. Further, a central axis of the third lens barrel unit 32 substantially coincides with the third optical axis A3. In addition, in FIG. 3, in order to simplify the description, a plurality of lenses may be omitted and expressed as one lens.

The first lens barrel unit 30 holds a first optical system L1. For example, the first optical system L1 is composed of a lens L11, a lens L12, a lens L13, a lens L14, a correction lens LC, and a lens L15, and is disposed along the first optical axis A1. The first optical system L1 forms an intermediate image MI of an optical image formed by the electrooptic element 21. Further, a stationary stop 33 is provided between the lens L13 and the lens L14. The stationary stop 33 narrows the luminous flux incident from the electrooptic unit 20.

The lens L11 of the first optical system L1 is an incidence lens to which light from the electrooptic element 21 which is an example of the electrooptic element is incident, and the first optical axis A1 which is the optical axis of the lens L11 is an example of the incidence optical axis.

A holding frame such as a holding frame 37 holds the lens L11, the lens L12, the lens L13, the correction lens LC, and the lens L15. The lens L11 and the lens L12 constitute a zoom lens group as an example.

The correction lens LC is a lens mainly responsible for correcting aberrations such as field curvature aberration. The correction lens LC is an aspherical lens which is advantageous for correcting aberrations.

On the other hand, the lenses constituting the first optical system L1 other than the correction lens LC are all formed of glass in the present embodiment. The dashboard 13 on which the projection lens 10 is disposed receives direct sunlight through the windshield 14. Therefore, the projection lens 10 may be exposed to a high temperature environment of about 120° C. The projection lens 10 is used in a high temperature environment as described above. Therefore, it is preferable to form the lens with glass rather than resin in consideration of heat resistance.

Further, a lens shift mechanism 25 is provided in the projection lens 10. An incident end of the first lens barrel unit 30 is attached to the lens shift mechanism 25. The lens shift mechanism 25 shifts the projection lens 10 with respect to the electrooptic element 21 in a direction orthogonal to the first optical axis A1 which is the incidence optical axis. Specifically, the projection lens 10 is shifted with respect to the electrooptic element 21 in the X-Z plane parallel to the screen of the electrooptic element 21 in the X direction and the Z direction. By shifting the projection lens 10 with respect to the electrooptic element 21 in the X-Z plane, the projection position of the image 17 can be shifted. The lens shift mechanism 25 is electrically operated by an actuator such as a solenoid.

The second lens barrel unit 31 holds a second optical system L2. For example, the second optical system L2 is composed of a lens L21 and a lens L22, and is disposed along the second optical axis A2. The lens L21 and the lens L22 are formed of glass. In the present embodiment, the second optical system L2 functions as a relay lens. Specifically, the second optical system L2 relays the luminous flux representing the intermediate image MI to the third lens barrel unit 32 with the intermediate image MI imaged by the first optical system L1 as a subject.

Further, the first mirror 38 is disposed on the incidence side of the second optical system L2, and a third optical system L3 is disposed on the emission side of the second optical system L2. The first mirror 38 and the second mirror 39 each are one of the optical elements constituting the deflecting optical system, and deflect the optical axis. The first mirror 38 reflects light on the first optical axis A1 such that the light becomes light on the second optical axis A2. The second mirror 39 reflects the light of the second optical axis A2 such that the light becomes light of the third optical axis A3. The first mirror 38 and the second mirror 39 are examples of a reflecting part that deflects the optical axis A by a reflective surface.

A first mirror accommodation unit 46 for accommodating the first mirror 38 is provided between the first lens barrel unit 30 and the second lens barrel unit 31. Further, the rear end part of the third lens barrel unit 32 constitutes a second mirror accommodation unit 47 accommodating the second mirror 39. A flexible light shielding member 48 is provided at the boundary between the second mirror accommodation unit 47 and the second lens barrel unit 31. The light shielding member 48 prevents external light from entering the projection lens 10 and light from leaking from the inside of the projection lens 10.

In the first mirror accommodation unit 46, the first mirror 38 is held in a posture in which a reflective surface 38A forms an angle of 45° with respect to each of the first optical axis A1 and the second optical axis A2. In a similar manner, the second mirror 39 is held in a posture in which the reflective surface 39A forms an angle of 45° with respect to each of the second optical axis A2 and the third optical axis A3. The first mirror 38 and the second mirror 39 are specular reflective type mirrors in which a transparent member such as glass is coated with a reflective film. The first mirror 38 and the second mirror 39 may be mirrors using a prism which totally reflects light.

The third lens barrel unit 32 holds the third optical system L3. The third optical system L3 is an emission optical system which emits the light reflected by the second mirror 39 to the outside of the projection lens 10. The third lens barrel unit 32 is composed of a lens L31, a lens L32, a lens L33, a lens L34, and an emission lens LE, and is disposed along the third optical axis A3.

The holding frame 41 holds the lens L31 and the lens L32. The lens L31 and the lens L32 constitute a focus lens group as an example. The holding frame 41 holds the lens L33 and the lens L34. The emission lens holding frame 42 holds the emission lens LE.

As described above, the projection lens 10 is necessary to have optical performance of short focus and wide angle. For this reason, the lens L33 and the lens L34 have a negative refractive power in order to magnify the projected image 17, and diverge the luminous flux. Here, the wide angle means an angle of view of equal to or greater than 60° in a half angle of view.

In the projection lens 10, the lens L33 and the lens L34 have a high refractive power in order to ensure a wide angle of view. In order to ensure a high refractive power, the lens L33 and the lens L34 are spherical lenses made of glass as an example, and a lens having a relatively small diameter is used in order to suppress an increase in weight.

Meanwhile, the emission lens LE mainly has a function of correcting aberrations in the third optical system L3, and has a complicated shape. The emission lens LE is an aspherical lens which is more advantageous for aberration correction than a spherical lens, and is formed of resin as an example.

Figure 4:
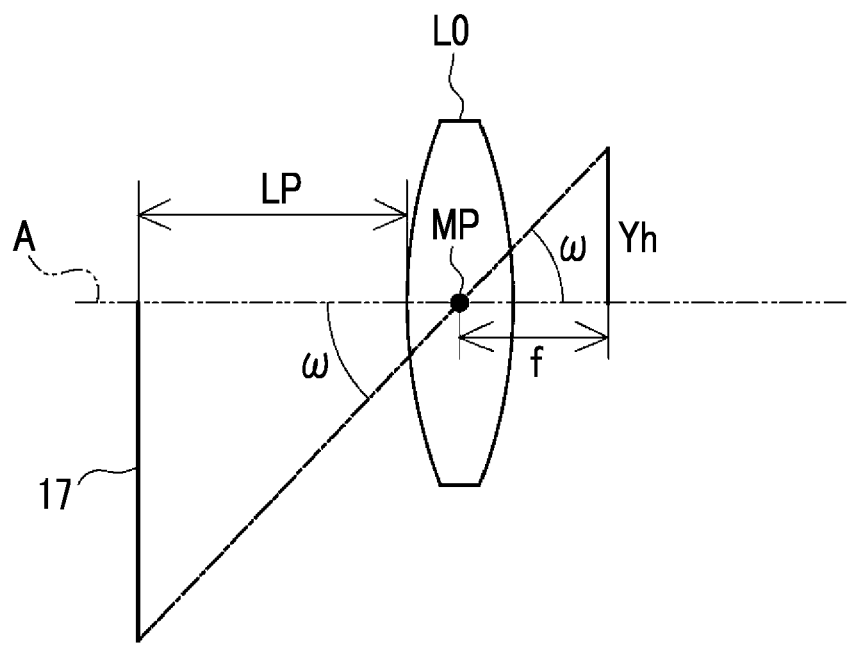
FIG. 4 is an explanatory diagram of a half angle of view, a projection distance, and the like, FIG. 5 is an explanatory diagram of a projection position of the projection lens.

In FIG. 4, an optical system L0 is a single lens schematically illustrating the entire optical system including the first optical system L1, the second optical system L2, and the third optical system L3 of the projection lens 10. The reference sign MP represents a principal point of the optical system L0, the reference sign f represents a focal length of the optical system L0, and Yh represents an image height. Further, the reference sign LP is a projection distance, which is a distance in the optical axis direction from the emission lens LE closest to the magnification side in the optical system L0 to the projection surface (in the present example, the windshield 14).

Assuming that an incidence angle of light incident onto the optical system L0 is θ, the relationship of Yh=f×tan θ is established. Assuming that a half angle of view of the maximum angle of view of the optical system L0 is ω, Yh=f×tan ω. The image height Yh is a factor which determines a size of an image circle 40 (refer to FIG. 6). The image circle 40 is a circular area in which light passing through the optical system L0 forms an image. The larger the image height Yh, the larger the image circle 40. The smaller the image height Yh, the smaller the image circle 40. In the case of the projection lens 10, the size of the image circle 40 relates to the screen size of the electrooptic element 21, and it is necessary for the image circle 40 to have a size in which the electrooptic element 21 can be accommodated.

In the projection lens 10, assuming that an effective diameter of the emission lens LE is DE, a focal length of the entire optical system including the emission lens LE, that is, the optical system L0 is f, and a half angle of view is ω, ω is equal to or greater than 600, and a value of PA defined by Expression (1) is in a range of 0.1 or more and 7 or less.

$$PA=DE/(f \times \tan \omega) \quad (1)$$

PA is a ratio of the effective diameter DE of the emission lens LE to the image height Yh (=f×tan ω) of the optical system L0.

In Expression (1), the focal length f is the focal length at a position closest to the wide angle side (that is, the wide side) in a case where the optical system L0 includes a zoom lens. The half angle of view ω is also halved of the maximum angle of view at a position closest to the wide angle side (that is, the wide side).

Figure 5:
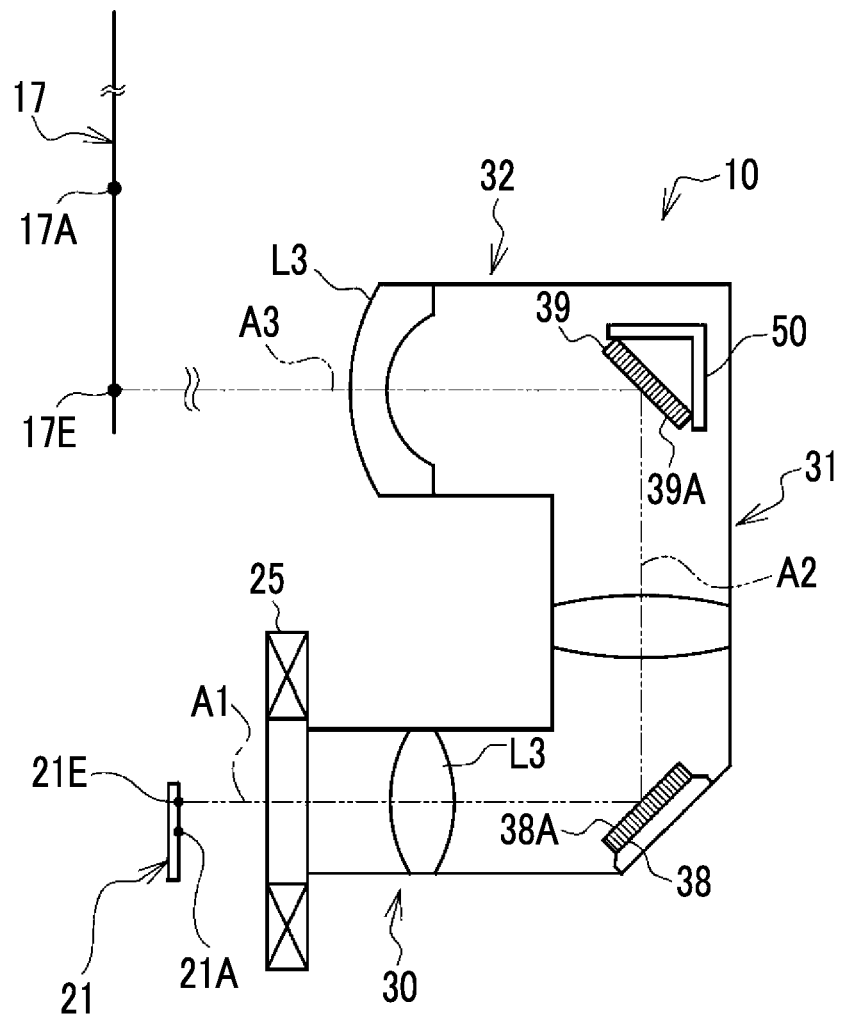
Figure 6:
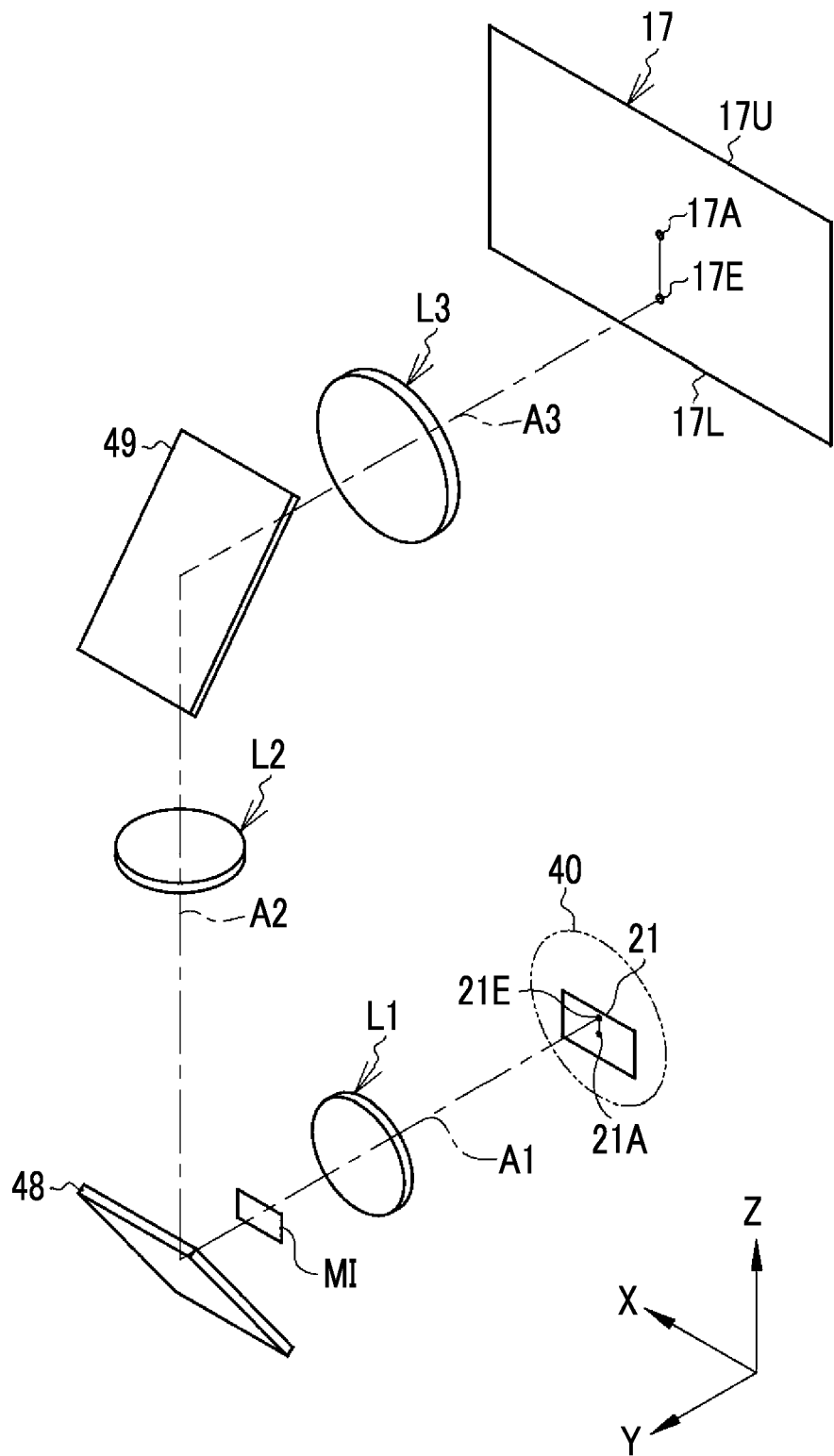
FIG. 6 is an explanatory diagram of the relationship between a lens shift and a projection position of an image.

As shown in FIGS. 5 and 6, the lens shift mechanism 25 shifts the projection lens 10 in the Z direction. Thereby, the first optical axis A1, which is the incidence optical axis, is shifted upward with respect to a center position 21A of the screen of the electrooptic element 21. As a result, as described above, the image 17 is projected by a so-called launch system in which the center 17A of the projection image 17 is positioned above the emission optical axis (third optical axis A3 in the present example). The reference sign 21E indicates an intersection of the first optical axis A1 and the screen of the electrooptic element 21, and the reference sign 17E indicates an intersection of the emission optical axis (third optical axis A3 in the present example) and the image 17. The Z direction is a top-bottom direction (that is, the vertical direction) of the electrooptic element 21, and is an example of the "first direction".

Figure 7A:
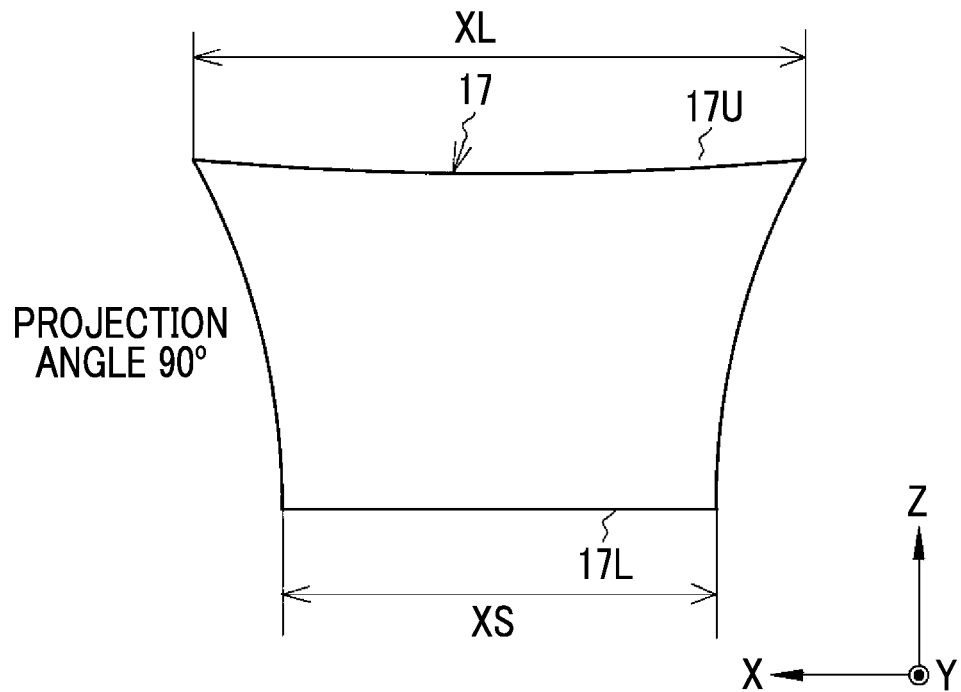
FIGS. 7A and 7B are explanatory diagrams each illustrating an example of a distortion characteristic.
Figure 7B:
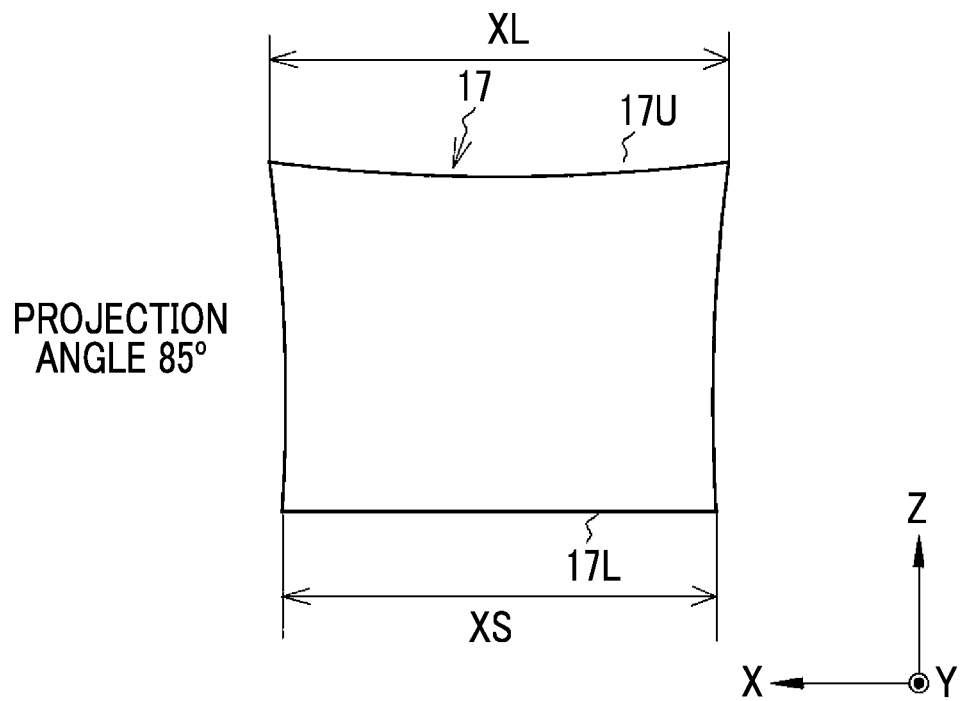

FIGS. 7A and 7B are explanatory diagrams each illustrating an example of distortion characteristics of the projection lens 10. As shown in FIGS. 7A and 7B, the projection lens 10 has a characteristic that pincushion distortion occurs in the image 17 in a case where the projection angle is 90°. The pincushion distortion is a distortion in which the center of each side of the image 17 is recessed toward the center 17A of the image 17, and each apex relatively projects outward. FIG. 7A shows distortion which occurs in the image 17 in a case where the projection angle is 90°, and FIG. 7B shows distortion which occurs in the image 17 in a case where the projection angle is less than 90°, specifically 85°.

It can be clearly seen in FIG. 7A where the projection angle is 90° that, in a case where the upper side 17U and the lower side 17L facing each other in the top-bottom direction (Z direction in the present example) of the image 17 are compared, the upper side 17U is longer and the lower side 17L is shorter. The reason for this is that, as shown in FIGS. 5 and 6, the projection lens 10 is shifted with respect to the center position 21A of the screen of the electrooptic element 21.

Figure 8:
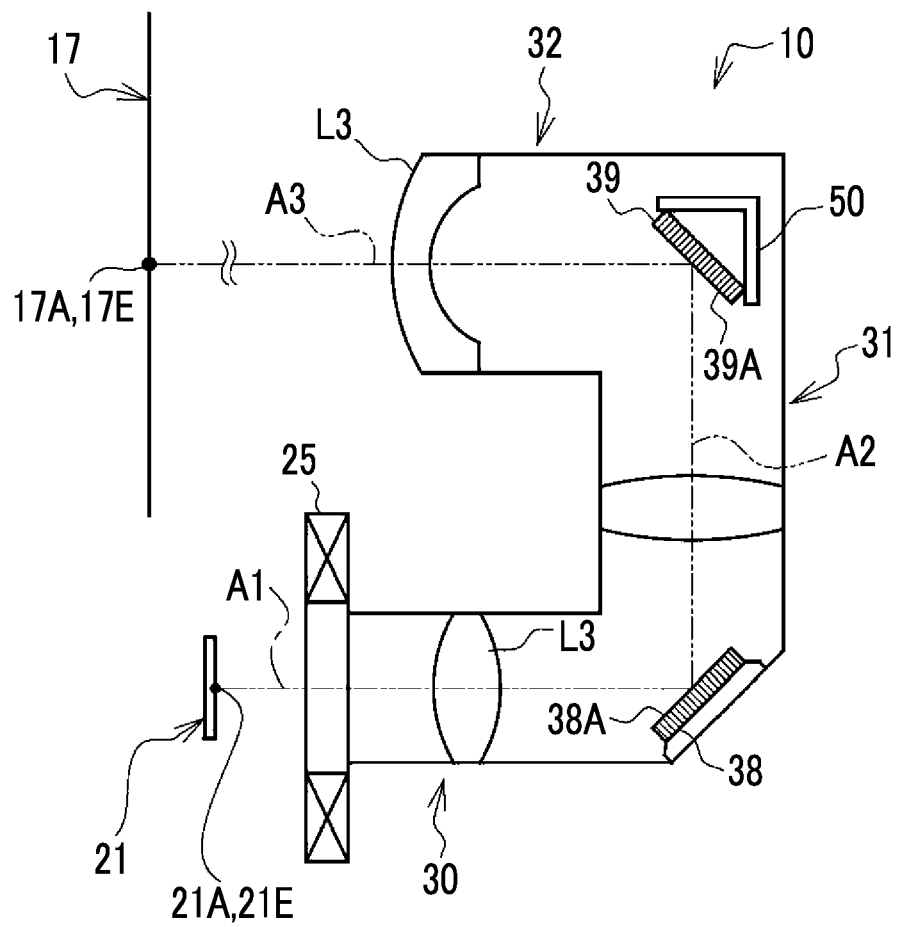
FIG. 8 is an explanatory diagram of a comparative example in which a lens is not shifted.
Figure 9:
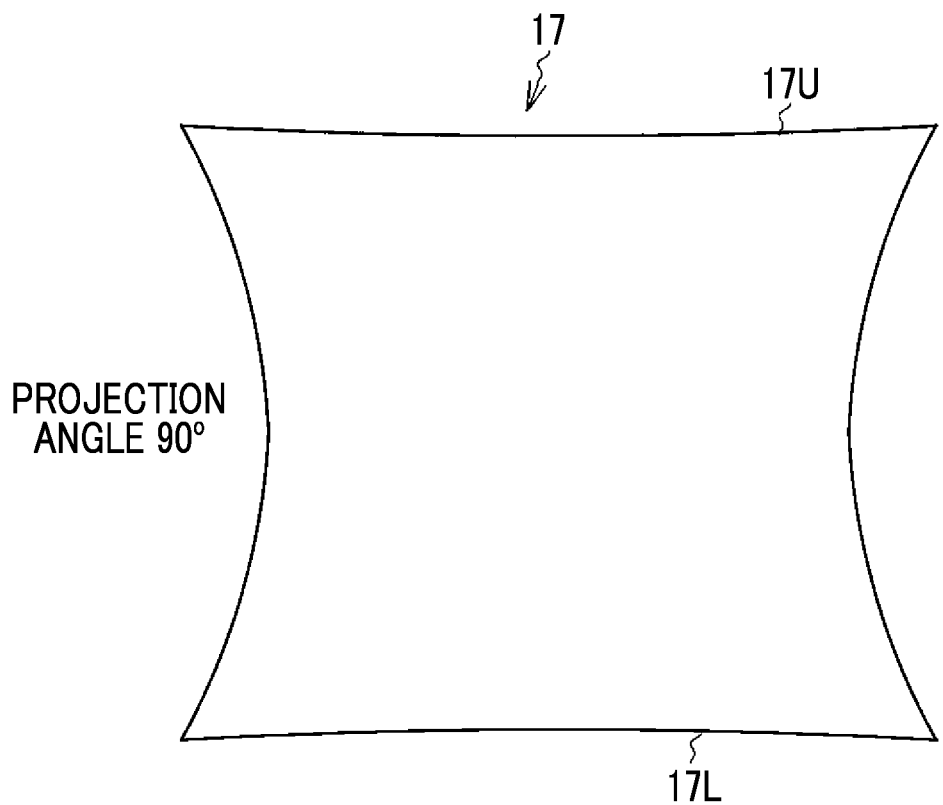
FIG. 9 is an explanatory diagram illustrating an example of the distortion in the case of Comparative Example shown in FIG. 8.

FIG. 8 shown as a comparative example is an example in which the projection lens 10 is not shifted, that is, the center position 21A of the screen of the electrooptic element 21 coincides with the first optical axis A1 which is the incidence optical axis. The projection angle in FIG. 8 is 90°. In the example shown in FIG. 8, the emission optical axis (third optical axis A3 in the present example) also coincides with the center 17A of the image 17. In such a case, as shown in FIG. 9, the distortion of the image 17 occurs such that the left and right sides of the image 17 are symmetric. The reason for this is that the center of the image circle 40 of the projection lens 10 coincides with the center position 21A of the screen of the electrooptic element 21.

On the other hand, as shown in FIGS. 5 and 6, in a case where the projection lens 10 is shifted in the top-bottom direction (Z direction in the present example) of the image 17, the center position of the image circle 40 and the center position 21A of the screen of the electrooptic element 21 are relatively deviated in the Z direction. For this reason, since the center 17A of the image 17 does not coincide with the emission optical axis (third optical axis A3 in the present example), distortion appears in an asymmetric shape in the top-bottom direction of the image 17, as shown in FIG. 7A.

In the projection lens 10, distortion as shown in FIG. 7A occurs in a case where the projection angle is 90°, but the distortion shown in FIG. 7A is reduced by setting the projection angle to less than 90° as shown in FIG. 7B. In a case where the projection angle is set to be less than 90°, the projection surface (windshield 14 in the present example) is inclined with respect to the emission optical axis (third optical axis A3 in the present example), as shown in FIG. 2 and the like. Specifically, the projection surface is tilted in a direction in which the projection position on the upper side 17U side of the image 17 is closer to the emission lens LE than the projection position on the lower side 17L side of the image 17. In a case where the projection position on the upper side 17U side is closer to the emission lens LE than the projection position on the lower side 17L side, a magnifying power of the upper side 17U of the image 17 is smaller than a magnifying power of the lower side 17L. Thereby, in FIG. 7B, a difference in length between the upper side 17U and the lower side 17L of the image 17 is reduced as compared with FIG. 7A.

Here, the distortion ratio PD is used as an indicator indicating the magnitude of distortion. The distortion ratio PD is a ratio of lengths of straight lines connecting both ends of the upper side 17U and the lower side 17L, which are two sides of the image 17 facing in the top-bottom direction. Among the straight line corresponding to the upper side 17U and the straight line corresponding to the lower side 17L, assuming that a length of the longer straight line is XL and a length of the shorter straight line is XS, the distortion ratio PD is defined by XL/XS. That is, the larger the ratio of the lengths of the upper side 17U and the lower side 17L of the image 17, the larger the distortion ratio PD. As a result, it is evaluated that the distortion is large. On the contrary, it is evaluated that the smaller the distortion ratio PD, the smaller the distortion.

The projection lens 10 of the present example has a characteristic that the distortion ratio PD is smaller in a case where the projection angle is less than 90° than in a case where the projection angle is 90°.

For example, assuming that the distortion ratio PD in a case where the projection angle is 90° is PD1 and the distortion ratio PD in a case where the projection angle is 85° is PD2, the projection lens 10 has a distortion characteristic that values of PD1 and PD2 satisfy Conditional Expression (2).

$$PD1 > PD2 \quad (2)$$

That is, the projection lens 10 has a characteristic that the distortion ratio PD1 is relatively large in a case where the projection angle is 90° and the distortion ratio PD2 is relatively small in a case where the projection angle is 850 (an example of an angle less than 90°).

In the projection lens 10 according to the technique of the present disclosure, the effective diameter DE of the emission lens LE is 7 times or less the image height Yh at the half angle of view ω. That is, by setting PA of Expression (1) to the upper limit value or less, an increase in diameter of the projection lens 10 is suppressed. On the other hand, by setting the projection angle to less than 90°, distortion is suppressed.

The distortion generally increases as the refractive power of the lens increases. In a case of trying to widen the angle of view, the method of increasing the diameter of the projection lens 10 including the emission lens LE is an effective method from the viewpoint of suppressing distortion. The reason for this is that in a case where the diameter of the projection lens 10 is increased, it is possible to achieve a wide angle of view while suppressing the refractive power for widening the angle of view.

In other words, in a case where an attempt is made to widen the angle of view without increasing the diameter of the emission lens LE, it is necessary to increase the negative refractive power in order to widen the angle of view in the optical system L0. However, in a case where the refractive power is increased, distortion increases.

However, reduction in size of the projection lens 10 is an issue which cannot be ignored in consideration of practical problems such as the limitation of the installation space of the projection lens 10. Thus, it is not possible to increase the diameter of the projection lens 10 without restriction only for the purpose of suppressing distortion.

Therefore, the projection lens 10 of the present disclosure sacrifices suppression of distortion in a case where the projection angle is 90° to some extent. Then, the projection lens 10 suppresses distortion by the method of suppressing an increase in diameter and setting the projection angle to less than 90°. As shown in FIGS. 7A and 7B, depending on the form of distortion which occurs in a case where the projection angle is 90°, distortion may be reduced by setting the projection angle to less than 90°. The projection lens 10 of the present disclosure aims to suppress distortion by using such a method. As described above, according to the technique of the present disclosure, it is possible to provide a projection lens 10 capable of suppressing both an increase in size and distortion even at a wide angle of view.

More specifically, as shown in FIG. 2 and the like, the projection angle is an angle which changes in a case where the emission optical axis (third optical axis A3 in the present example) is rotated in the tilt direction, that is, in a case where the position of the emission optical axis on the magnification side is changed in the top-bottom direction (Z direction in the present example) of the projected image 17 under assumption that the reduction side of the emission optical axis is set as a base point. By setting the projection angle which changes by tilting the emission optical axis to less than 90°, it is possible to reduce distortion which is represented as a difference between the length of the upper side 17U and the length of the lower side 17L of the image 17.

Further, by setting the lower limit value of PA in Expression (1) to equal to or greater than 0.1, the minimum size of the image circle 40 necessary for the electrooptic element 21 is ensured. Further, by allowing the effective diameter DE of the emission lens LE up to 7 times the image height Yh, it is possible to increase the diameter of the image circle 40 to some extent. Thereby, it is possible to ensure a necessary amount for the amount of shift of the lens shift. Further, in a case where the upper limit value of PA is greater than 7, the specification is overengineered from the viewpoint of reducing distortion. The configuration leads to an increase in the size of the projection lens 10 including the emission lens LE.

Further, in Expression (1), the preferable range of PA is equal to or greater than 0.5 and equal to or less than 7, the lower limit is more preferably equal to or greater than 1, and the upper limit is further preferably equal to or less than 5. In a case where the lower limit of the value of PA is less than 0.5, the effective diameter DE has to be kept small and the angle of view has to be increased. Therefore, the refractive power of the lens has to be increased and distortion is excessively large. In a case where distortion is excessively large, it may be difficult to correct even in a case where the projection angle is less than 90°. Further, by setting PA to 1 or more, it is possible to reduce distortion as compared with the case where the lower limit value is set to 0.5. Further, by setting the value of PA to 5 or less, it is possible to further suppress an increase in size of the projection lens 10 while ensuring the necessary size of the image circle 40.

Further, distortion of the projection lens 10 is a pincushion type as shown in FIGS. 7A and 7B. For this reason, the technique of the present disclosure is particularly effective in a case where the projection surface is convex toward the projection direction of the image 17. The projection surface of the present example is the windshield 14, but in a case where the projection lens 10 is provided on the dashboard 13, the windshield 14 is a projection surface convex toward the projection direction of the image 17. For this reason, the image 17 in which the pincushion distortion is generated is projected onto the windshield 14 convex toward the projection direction. Therefore, the outer edge of the image 17 is magnified so as to bulge outward. As a result, distortion is reduced. As described above, the projection surface convex toward the projection direction is effective for the image 17 in which the pincushion distortion occurs.

Further, with respect to the distortion ratio PD, by satisfying Conditional Expression (2), distortion can be reduced in a case where the projection angle is set to 85°.

Further, regarding the distortion ratio PD1 in a case where the projection angle is 90° and the distortion ratio PD2 in a case where the projection angle is 85°, in addition to Conditional Expression (2), it is preferable to further satisfy Conditional Expression (2-1).

$$PD1 - PD2 \geq 0.05 \quad (2\text{-}1)$$

The difference between PD1 and PD2 is an indicator indicating how much distortion is eliminated by changing the projection angle from 90° to 85°, and here, the difference between PD1 and PD2 is called the degree of elimination of distortion. It is evaluated that the greater the degree of elimination of distortion, the higher the reduction effect of distortion. In a case where the difference between PD1 and PD2 is equal to or greater than 0.05 and Conditional Expression (2-1) is satisfied, the reduction effect of distortion can be expected by setting the projection angle to 85°.

Further, regarding the distortion ratio PD2 in a case where the projection angle is 85°, in addition to Conditional Expression (2), it is preferable to further satisfy Conditional Expression (3).

$$PD2 \leq 1.2 \quad (3)$$

In a case where Conditional Expression (3) is satisfied, the difference between the upper side 17U and the lower side 17L is sufficiently small. Therefore, a more remarkable distortion reduction effect can be obtained.

Further, the second mirror 39 of the projection lens 10 is an example of a reflecting part which deflects the second optical axis A2 on the incidence side of the second mirror 39 toward the third optical axis A3 which is the emission optical axis. By providing the second mirror 39 as such a reflecting part, the total length of the projection lens 10 can be shortened as compared with the projection lens in which the optical axis is not deflected. Thereby, it is possible to reduce the size of the projection lens 10.

Next, numerical examples of the projection lens 10 according to the technique of the present disclosure will be described.

Example 1

Figure 10:
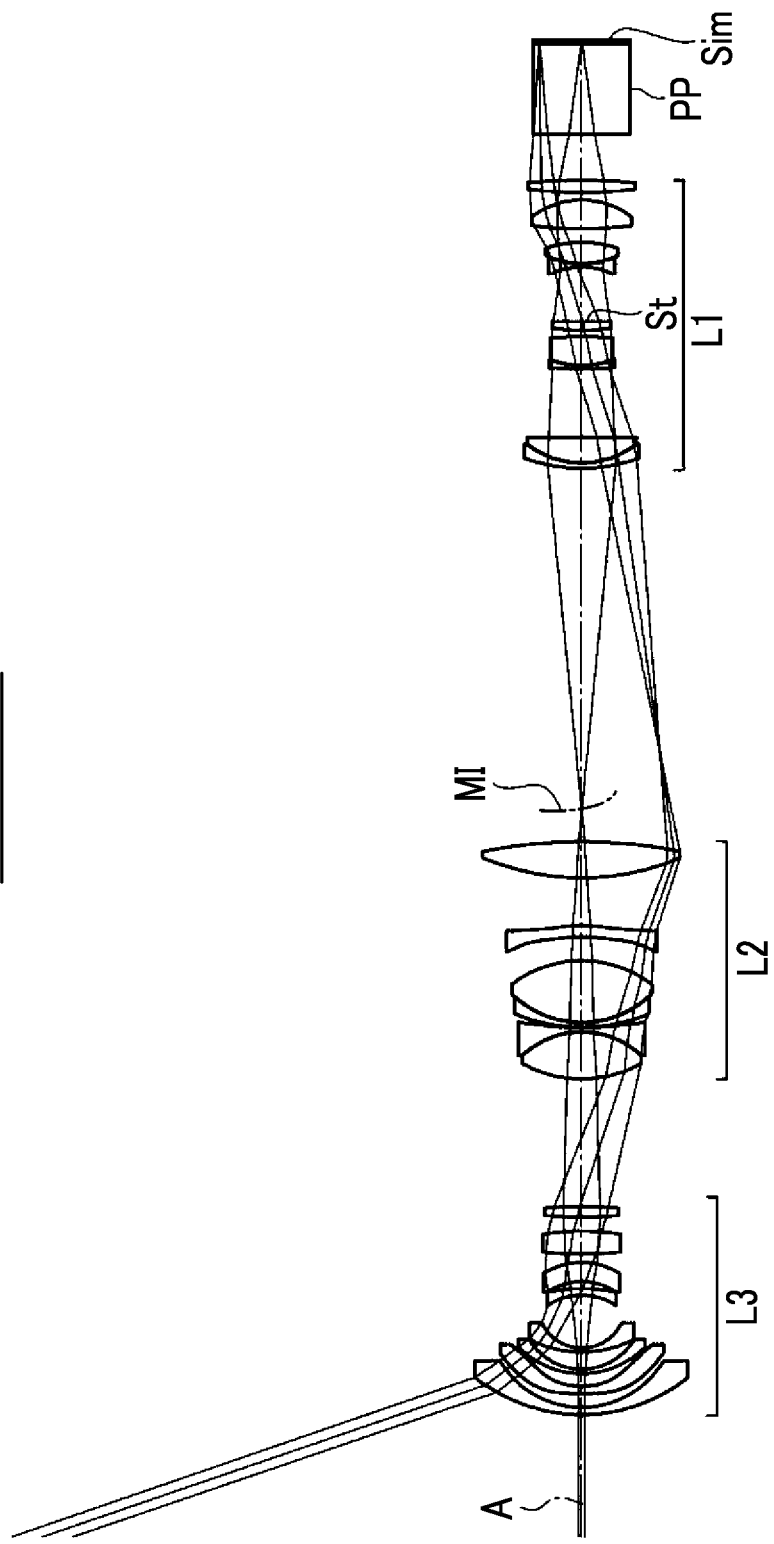
FIG. 10 is a cross-sectional view illustrating a configuration of an optical system according to Example 1A.
Figure 11:
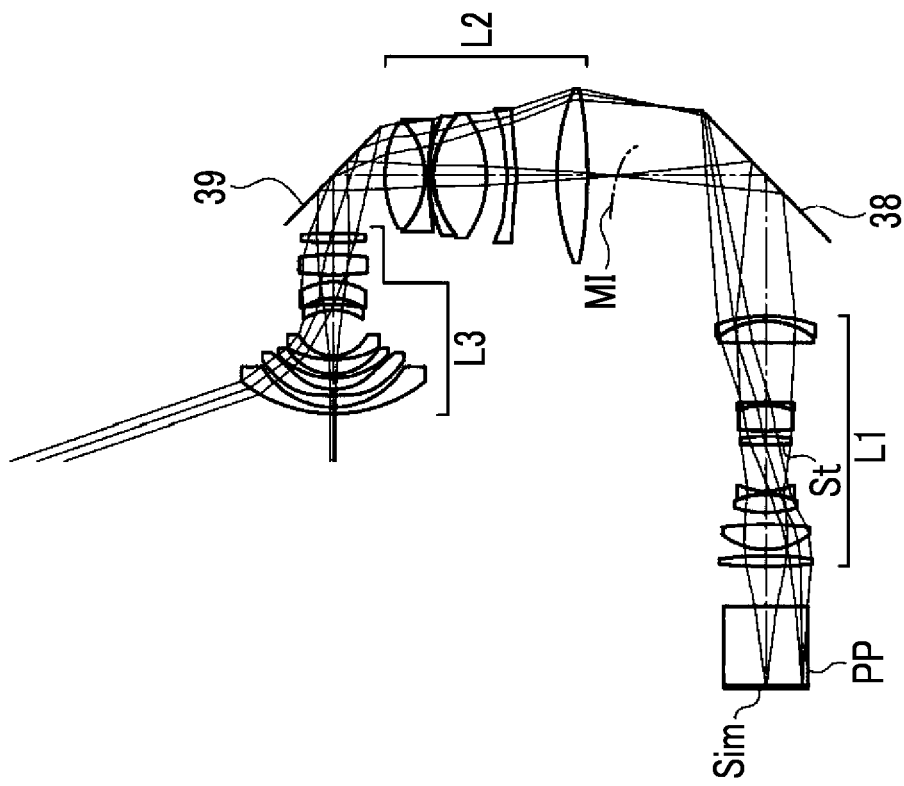
FIG. 11 is a cross-sectional view illustrating a configuration of an optical system according to Example 1B.

FIGS. 10 and 11 show cross-sectional views each illustrating a configuration of the optical system of the projection lens 10 of Example 1. Example 1A shown in FIG. 10 is an optical system which does not deflect the optical axis. Example 1B shown in FIG. 11 is a deflecting optical system in which diffraction and deflection performed twice by the first mirror 38 and the second mirror 39 as shown in FIG. 3 and the like are applied to an optical system having the same configuration as that of Example 1A shown in FIG. 10. Both Example 1A and Example 1B comprise, in order from the incidence side, a first optical system L1, a second optical system L2, and a third optical system L3. Example 1A and Example 1B comprise an aperture stop St, and the first optical system L1 forms an intermediate image MI in front of the second optical system L2.

Further, as shown in FIGS. 10 and 11, in both Example 1A and Example 1B, projection is performed in a launch type in which the center 17A of the projected image 17 is positioned above the optical axis due to a lens shift.

Figure 12A:
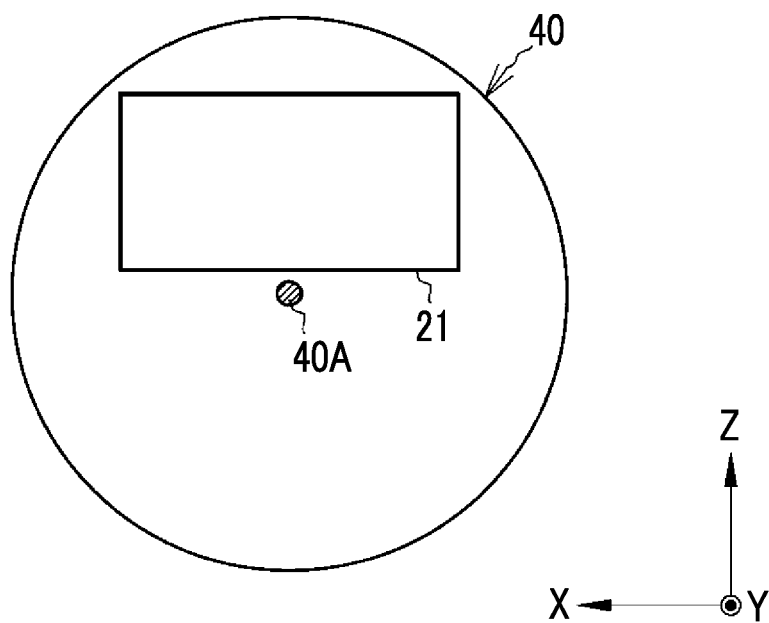
FIGS. 12A and 12B are explanatory diagrams each illustrating a direction of lens shift according to the example.
Figure 12B:
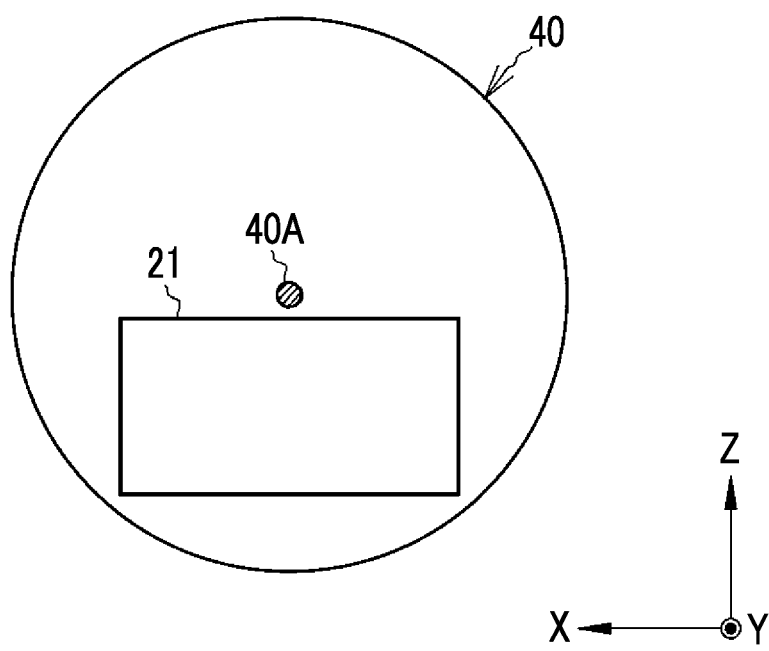

FIGS. 12A and 12B show directions of respective lens shifts of Example 1A and Example 1B. FIG. 12A shows a state of the lens shift of Example 1A shown in FIG. 10. In Example 1A, the lens shift is performed such that the entire electrooptic element 21 is positioned above the center 40A of the image circle 40. FIG. 12B shows a state of the lens shift of Example 1B shown in FIG. 11. In Example 1B, the lens shift is performed such that the entire electrooptic element 21 is positioned below the center 40A of the image circle 40.

Further, as a calculation condition of the numerical example, the screen of the electrooptic element 21 is horizontally long. The screen size of the short side in the top-bottom direction (that is, the vertical direction) is 8.165 [mm], and the screen size of the long side in the horizontal direction is 14.515 [mm]. The diameter of the image circle 40 is 24 [mm]. The screen size of the electrooptic element 21 and the diameter of the image circle 40 are the same in Examples 1, 2, and 3 and Comparative Example to be described below.

As can be seen from the ray diagrams of FIGS. 10 and 11, in both Example 1A and Example 1B, the shift direction of the projection position of the projected image 17 is the same upward. As shown in FIGS. 12A and 12B, the direction of the lens shift with respect to the electrooptic element 21 is different depending on whether or not the first mirror 38 and the second mirror 39 are present.

The following lens data of Example 1 is based on Example 1A. However, the only difference between Example 1A and Example 1B is whether or not the first mirror 38 and the second mirror 39 are present. Thus, the same lens data applied to Example 1B.

Table 1 shows basic lens data of the optical system of Example 1, Table 2 shows data about the specifications, and Tables 3 and 4 show data about the aspherical coefficient. Hereinafter, meanings of the symbols in the table will be described by taking the one of Example 1 as an example, but the same is basically true for Example 2, Example 3, and Comparative Example.

In the lens data shown in Table 1, the column of Si shows numbers of the i-th surface which is determined so as to gradually increase toward the reduction side, where the magnification side surface of the optical element closest to the magnification side is set as a first surface. The column of the paraxial curvature radius Ri shows values (mm (millimeters)) of the paraxial curvature radius of the i-th surface from the magnification side. Similarly, the column of the surface spacing Di shows spacings (mm (millimeters)) on the optical axis A between the i-th surface Si and the i+1th surface Si+1 from the magnification side. The column of Ndj shows values of the refractive index at the d line (a wavelength of 587.6 nm (nanometers)) of the j-th optical element from the magnification side. The column of vdj shows values of the Abbe number at the d line of the j-th optical element from the magnification side. The sign of the curvature radius is positive in a case where the surface shape is convex toward the magnification side, and is negative in a case where the surface shape is convex toward the reduction side. Table 1 also shows additionally the aperture stop St and the optical member PP, and in the column of the surface number of the surface corresponding to the aperture stop St, the surface number and (St) are noted.

The data about the specification in Table 2 show absolute values |f| of the focal length of the whole system, back focal lengths Bf of the whole system, F numbers, and values of the total angle of view $2\omega$. In addition, in the specification such as Table 2, FNo. means F number. The back focal length Bf indicates an air-converted value.

In the lens data of Table 1, a reference sign * is attached to surface numbers of aspherical surfaces, and numerical values of the paraxial curvature radius are written as the curvature radius of the aspherical surface. The data about the aspherical coefficients in Tables 3 and 4 shows aspherical surface numbers and aspherical coefficients on the aspherical surfaces. The "E±n" (n: an integer) in numerical values of the aspherical coefficients of Tables 3 and 4 indicates "×10$^{\pm n}$". The aspherical coefficient is a value of each of the coefficients KA and Am (m is an integer of 3 or more and differs for each surface) in the aspherical expression represented by the following expression.

$$Zd = C \cdot h^2 / \{1 + (1 - KA \cdot C^2 \cdot h^2)^{1/2}\} + \Sigma Am \cdot h^m$$

Here,

Zd is an aspherical surface depth (a length of a perpendicular from a point on an aspherical surface at height h to a plane that is perpendicular to the optical axis and that is in contact with the vertex of the aspherical surface), h is a height (distance from the optical axis), C is an inverse of the paraxial curvature radius.

KA and Am are aspherical coefficients (m is an integer of 3 or more and differs from face to face), and $\Sigma$ at the aspherical surface depth Zd means the sum with respect to m.

In the lens data and the data about specifications, degrees (°) are used as a unit of an angle, and millimeters (mm) are used as a unit of a length, but appropriate different units may be used since the optical system can be used even in a case where the system is enlarged or reduced in proportion.

TABLE 1

Example 1·Lens Data

| Si | Ri | Di | Ndj | vdi |
|---|---|---|---|---|
| 1 | 49.0202 | 2.0009 | 1.77250 | 49.60 |
| 2 | 27.2177 | 3.8083 | | |
| *3 | ∞ | 2.0005 | 1.58313 | 59.46 |
| *4 | 25.0000 | 3.5037 | | |
| 5 | 25.4501 | 1.2000 | 1.84666 | 23.78 |
| 6 | 17.5678 | 4.7329 | | |
| 7 | 32.4789 | 1.1000 | 1.77250 | 49.60 |
| 8 | 12.6389 | 14.5713 | | |
| 9 | −17.7556 | 1.8006 | 1.48749 | 70.44 |
| 10 | −48.6749 | 1.9577 | | |
| 11 | −17.6053 | 5.2593 | 1.51742 | 52.43 |
| 12 | −20.4046 | 2.2655 | | |
| 13 | 92.1304 | 6.3517 | 1.80610 | 33.27 |
| 14 | −71.6634 | 3.83.34 | | |
| 15 | 98.7208 | 2.9910 | 1.74320 | 49.34 |
| 16 | −107.0506 | 35.0956 | | |
| 17 | 34.9374 | 12.9781 | 1.49700 | 81.54 |
| 18 | −24.8173 | 1.3015 | 1.84666 | 23.78 |
| 19 | 106.6003 | 0.1010 | | |
| 20 | 50.5182 | 1.2923 | 1.84666 | 23.78 |
| 21 | 28.7914 | 17.0091 | 1.49700 | 81.54 |
| 22 | −33.4230 | 6.6194 | | |

TABLE 1-continued

Example 1·Lens Data

| Si | Ri | Di | Ndj | vdi |
|---|---|---|---|---|
| *23 | −33.1051 | 3.1385 | 1.58313 | 59.46 |
| *24 | −28.1405 | 13.0827 | | |
| 25 | 72.4421 | 9.9636 | 1.80518 | 25.45 |
| 26 | −143.6659 | 102.6638 | | |
| 27 | 48.8217 | 1.5003 | 1.84666 | 23.78 |
| 28 | 25.6921 | 6.9670 | 1.80100 | 34.97 |
| 29 | −5954.2376 | 18.9340 | | |
| 30 | 139.0588 | 0.9231 | 1.84666 | 23.78 |
| 31 | 25.0858 | 7.9683 | 1.51680 | 64.20 |
| 32 | −100.4339 | 1.7701 | | |
| 33 | 62.1521 | 2.4857 | 1.80518 | 25.42 |
| 34 | −1224.9959 | 0.0000 | | |
| 35 (St) | ∞ | 14.9361 | | |
| 36 | −20.7568 | 0.92.31 | 1.77250 | 49.60 |
| 37 | 24.8043 | 5.8984 | 1.49700 | 81.54 |
| 38 | −32.6710 | 3.7259 | | |
| 39 | 114.1082 | 7.9649 | 1.49700 | 81.54 |
| 40 | −23.4897 | 2.0001 | | |
| 41 | 113.4435 | 3.3892 | 1.84666 | 23.78 |
| 42 | −180.5251 | 12.7180 | | |
| 43 | ∞ | 26.0500 | 1.51633 | 64.14 |
| 44 | ∞ | | | |

TABLE 2

Example 1·Specification (d line)

| |f| | 4.63 |
|---|---|
| Bf | 29.87 |
| FNo. | 2.43 |
| 2ω[°] | 143.0 |

TABLE 3

Example 1·Aspherical coefficient

| Si | *3 | *4 |
|---|---|---|
| KA | −4.99999087E+00 | −5.98339733E−01 |
| A3 | 1.90619453E−03 | 2.11598116E−03 |
| A4 | −3.95764342E−04 | −4.75092928E−04 |
| A5 | 3.66328881E−05 | 4.10359235E−05 |
| A6 | 1.78919716E−06 | 1.58950366E−06 |
| A7 | −4.36343346E−07 | −2.28162357E−07 |
| A8 | 1.38535397E−08 | −8.14059571E−09 |
| A9 | 1.25052875E−09 | 9.76383471E−10 |
| A10 | −9.16509111E−11 | 1.53917661E−11 |
| A11 | −5,19676916E−13 | −2.11042644E−12 |
| A12 | 2.11636512E−13 | −2.27683595E−14 |
| A13 | −3.94929389E−15 | 2.67311865E−15 |
| A14 | −2.19440182E−16 | 3.26596921E−17 |
| A15 | 8.30044149E−18 | −2.02012554E−18 |
| A16 | 6.89877752E−20 | −3.49339193E−20 |
| A17 | −6.65802094E−21 | 8.37110599E−22 |
| A18 | 4.21495427E−23 | 2.11501358E−23 |
| A19 | 1.96968905E−24 | −1.47932574E−25 |
| A20 | −2.67730424E−26 | −5.19706411E−27 |

TABLE 4

Example 1·Aspherical coefficient

| Si | *23 | *24 |
|---|---|---|
| KA | −1.11870842E+00 | −1.04364360E+00 |
| A3 | 0.00000000E+00 | 0.00000000E+00 |
| A4 | 1.42519056E−04 | 1.40146290E−04 |
| A5 | −1.98022863E−05 | −1.29768358E−05 |
| A6 | 1.39469058E−06 | −3.38628321E−09 |

TABLE 4-continued

Example 1•Aspherical coefficient

| Si | *23 | *24 |
|---|---|---|
| A7 | 1.05709969E−07 | 2.25565767E−07 |
| A8 | −1.65686835E−08 | −1.21482952E−08 |
| A9 | −4.29853973E−10 | −1.66405721E−09 |
| A10 | 9.05705644E−11 | 1.21364329E−10 |
| A11 | 1.36851479E−12 | 5.82704856E−12 |
| A12 | −2.57109992E−13 | −5.36540603E−13 |
| A13 | −9.42766682E−15 | −1.11840449E−14 |
| A14 | 6.21607996E−16 | 1.33447922E−15 |
| A15 | 3.73089342E−17 | 1.19751396E−17 |
| A16 | −1.56412518E−18 | −1.96732812E−18 |
| A17 | −6.22524164E−20 | −6.28222168E−21 |
| A18 | 2.45562730E−21 | 1.61831930E−21 |
| A19 | 3.69570345E−23 | 9.21189520E−25 |
| A20 | −1.50385101E−24 | −5.73149444E−25 |

Example 2

Figure 13:
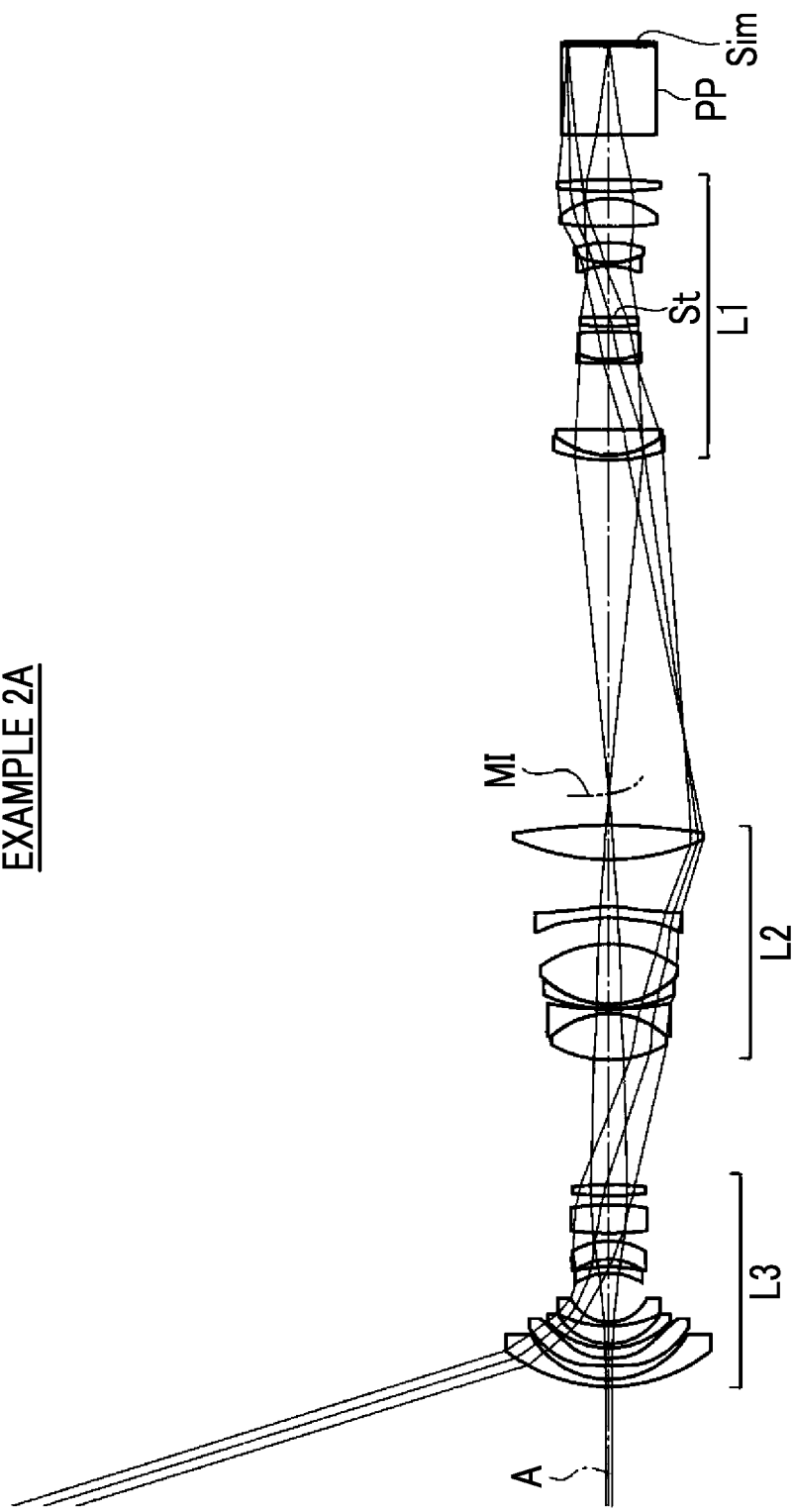
FIG. 13 is a cross-sectional view illustrating a configuration of an optical system according to Example 2A.
Figure 14:
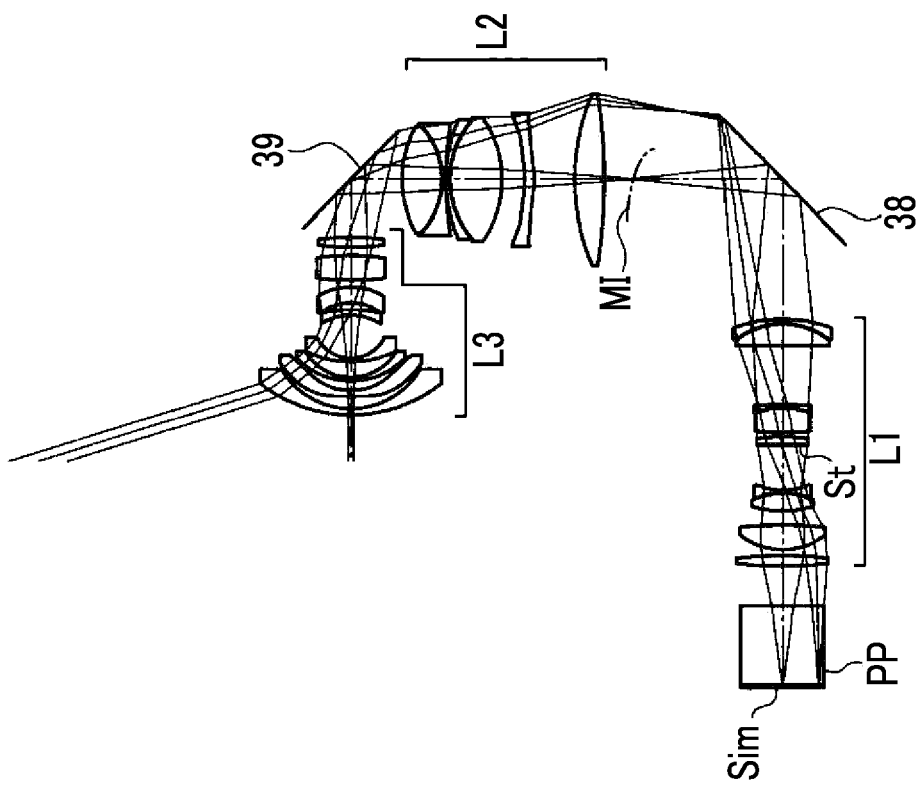
FIG. 14 is a cross-sectional view illustrating a configuration of an optical system according to Example 2B.

Next, an optical system of Example 2 will be described. FIGS. 13 and 14 are cross-sectional views each illustrating a configuration of the optical system of Example 2. Since the method of illustrating each of the examples shown in FIG. 13 and the following drawings is the same as that in FIGS. 10 and 11 described above, the description thereof will not be repeated.

Example 2A shown in FIG. 13 is an optical system in a case where the optical axis is not deflected. Example 2B shown in FIG. 14 is a deflecting optical system in which diffraction and deflection performed twice by the first mirror 38 and the second mirror 39 as shown in FIG. 3 and the like are applied to an optical system having the same configuration as that of Example 2A shown in FIG. 13. Both Example 2A and Example 2B comprise, in order from the incidence side, a first optical system L1, a second optical system L2, and a third optical system L3. Example 2A and Example 2B comprise an aperture stop St, and the first optical system L1 forms an intermediate image MI in front of the second optical system L2. Such basic configurations of Example 2A and Example 2B are the same as those of Example 1A and Example 1B shown in FIGS. 10 and 11.

Further, as shown in FIGS. 13 and 14, in both Example 2A and Example 2B, the center 17A of the projected image 17 is projected by the launch type positioned above the optical axis due to the lens shift shown in FIGS. 12A and 12B. Further, also in this point of view, Example 2A and Example 2B are the same as Example 1A and Example 1B shown in FIGS. 10 and 11.

Table 5 shows basic lens data of the optical system of Example 2, Table 6 shows data about the specifications, and Tables 7 and 8 show data about the aspherical coefficient. The following lens data of Example 2 is based on Example 2A. However, the only difference between Example 2A and Example 2B is whether or not the first mirror 38 and the second mirror 39 are present. Thus, the same lens data applied to Example 2B.

TABLE 5

Example 2•Lens Data

| Si | Ri | Di | Ndj | vdj |
|---|---|---|---|---|
| 1 | 48.6558 | 2.0009 | 1.80400 | 46.53 |
| 2 | 26.7859 | 3.8927 | | |
| *3 | ∞ | 2.0006 | 1.58313 | 59.46 |
| *4 | 25.0000 | 2.9534 | | |
| 5 | 24.8954 | 1.2000 | 1.84666 | 23.78 |
| 6 | 17.5232 | 4.9883 | | |
| 7 | 33.8183 | 1.1000 | 1.77250 | 49.60 |
| 8 | 12.4414 | 13.7947 | | |
| 9 | −18.4767 | 1.8010 | 1.48749 | 70.44 |
| 10 | −46.3440 | 2.1271 | | |
| 11 | −16.9385 | 5.1370 | 1.51742 | 52.43 |
| 12 | −20.7967 | 2.2473 | | |
| 13 | 92.1846 | 7.9550 | 1.80610 | 33.27 |
| 14 | −70.3842 | 2.6404 | | |
| 15 | 98.6798 | 3.0261 | 1.74400 | 44.79 |
| 16 | −107.0550 | 35.2385 | | |
| 17 | 34.8770 | 12.9637 | 1.49700 | 81.54 |
| 18 | −24.7742 | 1.3015 | 1.84666 | 23.78 |
| 19 | 100.9716 | 0.1009 | | |
| 20 | 47.2892 | 1.2923 | 1.84666 | 23.78 |
| 21 | 28.3500 | 17.0099 | 1.49700 | 81.54 |
| 22 | −33.9899 | 7.3827 | | |
| *23 | −33.8218 | 3.1385 | 1.58313 | 59.46 |
| *24 | −28.4897 | 13.2416 | | |
| 25 | 68.5842 | 9.6362 | 1.80518 | 25.45 |
| 26 | −170.2587 | 102.6629 | | |
| 27 | 48.2591 | 1.5009 | 1.84666 | 23.78 |
| 28 | 25.3007 | 7.0382 | 1.80100 | 34.97 |
| 29 | −19502.0153 | 18.8350 | | |
| 30 | 144.3395 | 0.9231 | 1.84666 | 23.78 |
| 31 | 24.6861 | 7.9878 | 1.51680 | 64.20 |
| 32 | −99.0039 | 1.4813 | | |
| 33 | 63.2507 | 2.5191 | 1.80518 | 25.46 |
| 34 | −395.9060 | 0.0007 | | |
| 35 (St) | ∞ | 14.5302 | | |
| 36 | −21.2319 | 0.9231 | 1.77250 | 49.60 |
| 37 | 23.3661 | 5.6939 | 1.49700 | 81.54 |
| 38 | −34.8472 | 4.5056 | | |
| 39 | 122.9483 | 7.9055 | 1.49700 | 81.54 |
| 40 | −23.1962 | 2.0010 | | |
| 41 | 128.7322 | 3.3417 | 1.84666 | 23.78 |
| 42 | −155.9381 | 12.7168 | | |
| 43 | ∞ | 26.0500 | 1.51633 | 64.14 |
| 44 | ∞ | | | |

TABLE 6

Example 2•Specification

| | |
|---|---|
| \|f\| | 4.62 |
| Bf | 29.87 |
| FNo. | 2.40 |
| 2ω[°] | 146.0 |

TABLE 7

Example 2•Aspherical coefficient

| Si | *3 | *4 |
|---|---|---|
| KA | −4.99999087E+00 | −3.82489973E−01 |
| A3 | 1.51378427E−03 | 1.70244598E−03 |
| A4 | −3.61871436E−04 | −4.43533947E−04 |
| A5 | 3.71516300E−05 | 4.28862530E−05 |
| A6 | 1.41382704E−06 | 1.21555372E−06 |
| A7 | −4.03837108E−07 | −2.33368229E−07 |
| A8 | 1.34412126E−08 | −5.51855328E−09 |
| A9 | 1.11154356E−09 | 9.56497853E−10 |
| A10 | −8.18500550E−11 | 6.33822558E−12 |
| A11 | −4.75118567E−13 | −2.00585950E−12 |
| A12 | 1.81585701E−13 | −3.29684336E−15 |
| A13 | −3.14725898E−15 | 2.46802302E−15 |
| A14 | −1.84339550E−16 | 5.61820615E−18 |
| A15 | 6.43587720E−18 | −1.80959461E−18 |

TABLE 7-continued

Example 2·Aspherical coefficient

| Si | *3 | *4 |
|---|---|---|
| A16 | 6.18536633E-20 | -1.14719399E-20 |
| A17 | -4.98967358E-21 | 7.26398179E-22 |
| A18 | 2.64209286E-23 | 9.60785829E-24 |
| A19 | 1.42495570E-24 | -1.24097518E-25 |
| A20 | -1.79884261E-26 | -2.75717433E-27 |

TABLE 8

Example 2·Aspherical coefficient

| Si | *23 | *24 |
|---|---|---|
| KA | -6.09647592E-01 | -1.09875190E+00 |
| A3 | 0.00000000E+00 | 0.00000000E+00 |
| A4 | 1.1972.3221E-04 | 1.13999407E-04 |
| A5 | -1.99294195E-05 | -1.20436023E-05 |
| A6 | 1.59015148E-06 | -7.41112754E-08 |
| A7 | 1.12868492E-07 | 2.46750913E-07 |
| A8 | -1.66550291E-08 | -1.08920546E-08 |
| A9 | -6.59960378E-10 | -2.04405344E-09 |
| A10 | 8.95345270E-11 | 1.24695182E-10 |
| A11 | 3.65764664E-12 | 8.18678311E-12 |
| A12 | -2.83075045E-13 | -6.07664410E-13 |
| A13 | -2.09154199E-14 | -1.87735801E-14 |
| A14 | 8.82866412E-16 | 1.65482394E-15 |
| A15 | 6.81376310E-17 | 2.55373090E-17 |
| A16 | -2.50312018E-18 | -2.65966284E-18 |
| A17 | -1.04036978E-19 | -1.90100430E-20 |
| A18 | 3.95321631E-21 | 2.36747747E-21 |
| A19 | 5.93757552E-23 | 5.78115416E-24 |
| A20 | -2.39677872E-24 | -8.98666077E-25 |

Figure 15:
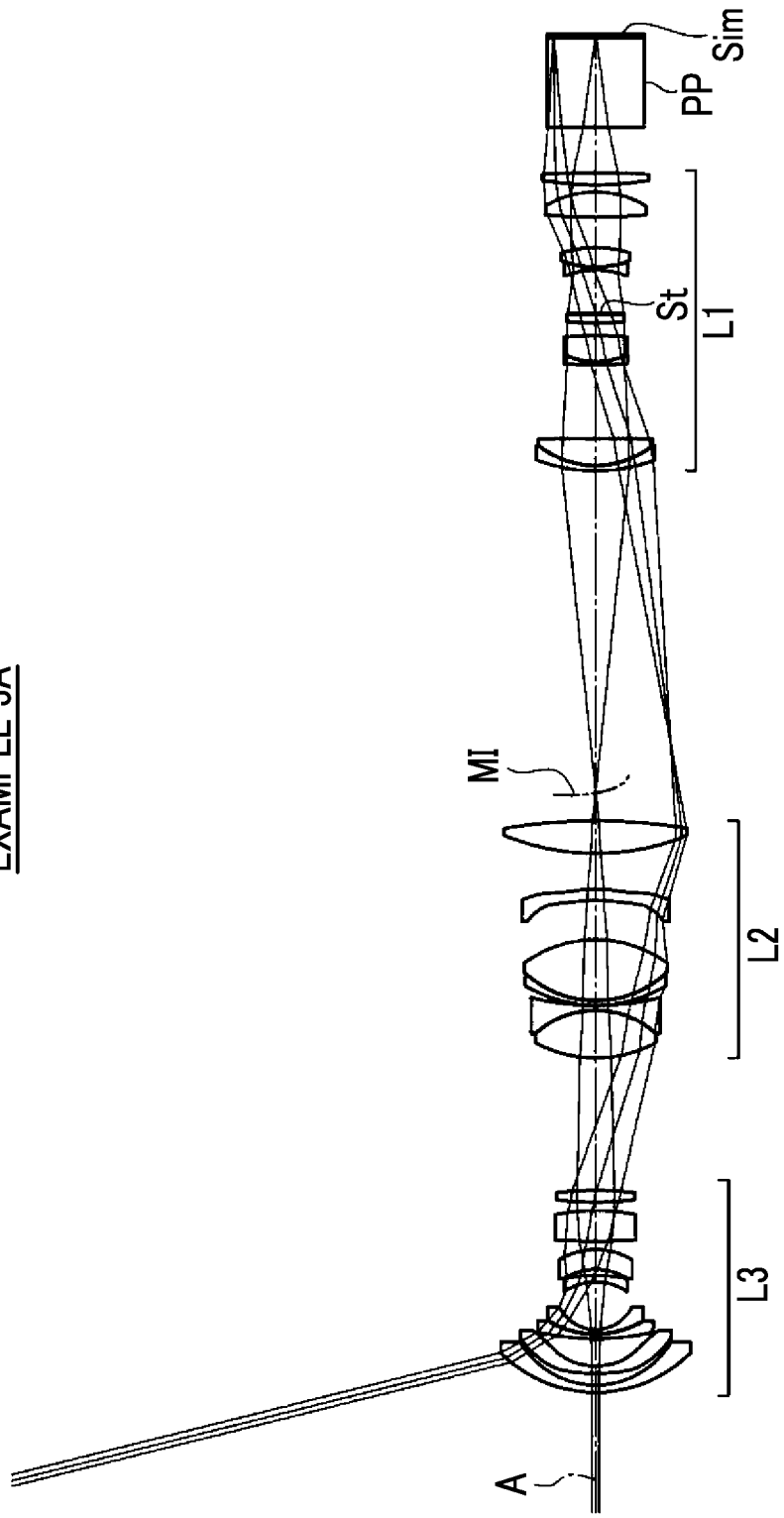
FIG. 15 is a cross-sectional view illustrating a configuration of an optical system according to Example 3A.
Figure 16:
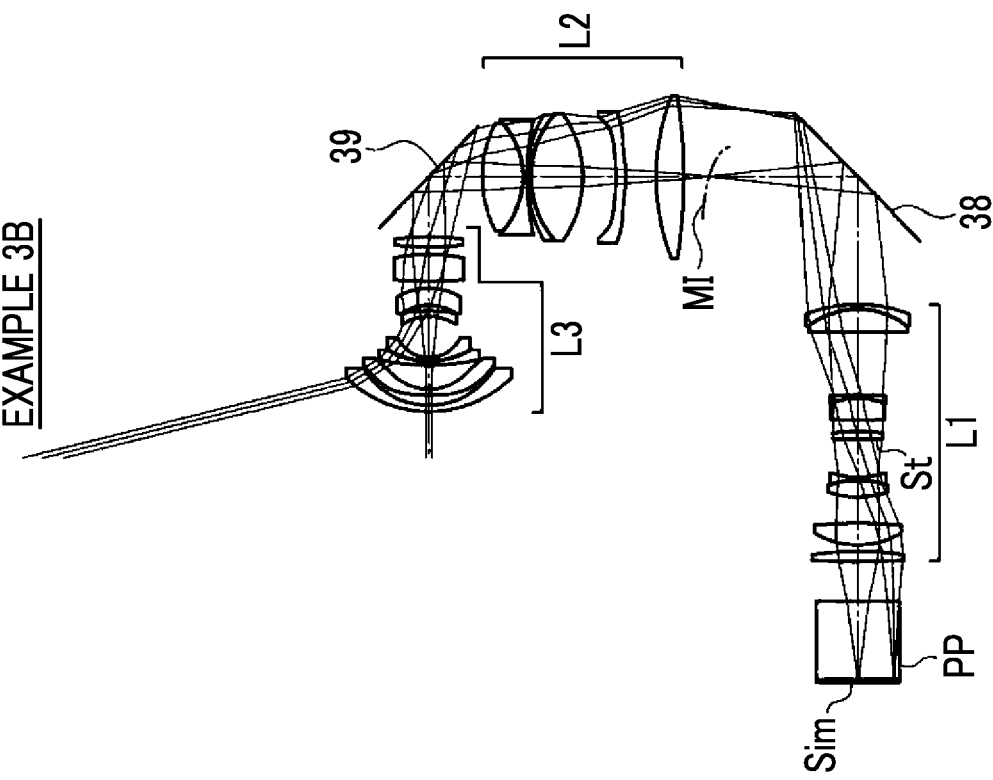
FIG. 16 is a cross-sectional view illustrating a configuration of an optical system according to Example 3B.

Next, an optical system of Example 3 will be described. FIGS. 15 and 16 are cross-sectional views each illustrating a configuration of the optical system of Example 3.

Example 3A shown in FIG. 15 is an optical system in a case where the optical axis is not deflected. Example 3B shown in FIG. 16 is a deflecting optical system in which diffraction and deflection performed twice by the first mirror 38 and the second mirror 39 as shown in FIG. 3 and the like are applied to an optical system having the same configuration as that of Example 3A shown in FIG. 15. Both Example 3A and Example 3B comprise, in order from the incidence side, a first optical system L1, a second optical system L2, and a third optical system L3. Example 3A and Example 3B comprise an aperture stop St, and the first optical system L1 forms an intermediate image MI in front of the second optical system L2. Such basic configurations of Example 3A and Example 3B are the same as those of Example 1A and Example 1B shown in FIGS. 10 and 11.

Further, as shown in FIGS. 15 and 16, in both Example 3A and Example 3B, the center 17A of the projected image 17 is projected by the launch type positioned above the optical axis due to the lens shift shown in FIGS. 12A and 12B. Also in this point of view, Example 3A and Example 3B are the same as Example 1A and Example 1B shown in FIGS. 10 and 11.

Table 9 shows basic lens data of the optical system of Example 3, Table 10 shows data about the specifications, and Tables 11 and 12 show data about the aspherical coefficient.

The following lens data of Example 3 is based on Example 3A. However, the only difference between Example 3A and Example 3B is whether or not the first mirror 38 and the second mirror 39 are present. Thus, the same lens data applied to Example 3B.

TABLE 9

Example 3·Lens Data

| Si | Ri | Di | Ndj | vdj |
|---|---|---|---|---|
| 1 | 38.9825 | 2.0009 | 1.80400 | 46.53 |
| 2 | 25.3271 | 3.3407 | | |
| *3 | ∞ | 2.0006 | 1.58313 | 59.46 |
| *4 | 25.0000 | 7.6119 | | |
| 5 | 75.1586 | 1.2000 | 1.84666 | 2.3.78 |
| 6 | 26.9129 | 0.22.13 | | |
| 7 | 27.2973 | 1.1000 | 1.77250 | 49.60 |
| 8 | 11.5746 | 13.3450 | | |
| 9 | -15.7967 | 1.8000 | 1.48749 | 70.44 |
| 10 | -44.0599 | 1.7929 | | |
| 11 | -16.5497 | 5.5231 | 1.51742 | 52.43 |
| 12 | -20.1064 | 2.2.618 | | |
| 13 | 177.4785 | 8.5997 | 1.80610 | 33.27 |
| 14 | -57.1584 | 2.3453 | | |
| 15 | 95.4359 | 3.3138 | 1.74400 | 44.79 |
| 16 | -91.9100 | 36.6303 | | |
| 17 | 36.2811 | 13.4099 | 1.49700 | 81.54 |
| 18 | -25.6580 | 1.3015 | 1.84666 | 23.78 |
| 19 | 75.9040 | 0.1008 | | |
| 20 | 39.7176 | 1.2923 | 1.84666 | 2.3.78 |
| 21 | 30.1575 | 17.0096 | 1.49700 | 81.54 |
| 22 | -34.9515 | 10.9385 | | |
| *23 | -38.1062 | 3.1385 | 1.58313 | 59.46 |
| *24 | -30.3405 | 9.9877 | | |
| 25 | 70.3481 | 9.0774 | 1.80518 | 25.45 |
| 26 | -162.2828 | 97.7884 | | |
| 27 | 48.7940 | 1.5000 | 1.84666 | 23.78 |
| 28 | 26.9040 | 7.54.38 | 1.80100 | 34.97 |
| 29 | -818.5433 | 20.2120 | | |
| 30 | 117.9005 | 0.9231 | 1.84666 | 23.78 |
| 31 | 21.8785 | 7.2051 | 1.51680 | 64.20 |
| 32 | -171.1285 | 3.5742 | | |
| 33 | 61.9459 | 2.4947 | 1.80518 | 25.46 |
| 34 | -388.0297 | 0.0007 | | |
| 35 (St) | ∞ | 12.2710 | | |
| 36 | -25.7001 | 0.9231 | 1.77250 | 49.60 |
| 37 | 28.8838 | 5.5253 | 1.49700 | 81.54 |
| 38 | -31.2485 | 8.4526 | | |
| 39 | 160.1808 | 7.0374 | 1.49700 | 81.54 |
| 40 | -28.1027 | 2.0000 | | |
| 41 | 99.1904 | 3.3267 | 1.84666 | 23.78 |
| 42 | -273.4027 | 12.7117 | | |
| 43 | ∞ | 26.0500 | 1.51633 | 64.14 |
| 44 | ∞ | | | |

TABLE 10

Example 3·Specification

| |f| | 4.63 |
|---|---|
| Bf | 29.86 |
| FNo. | 2.40 |
| 2ω[°] | 152.6 |

TABLE 11

Example 3·Aspherical coefficient

| Si | *3 | *4 |
|---|---|---|
| KA | -4.99999087E+00 | -3.43417732E-01 |
| A3 | 2.73094100E-03 | 3.17823471E-03 |
| A4 | -4.75975059E-04 | -6.16806895E-04 |
| A5 | 2.81661393E-05 | 4.40221698E-05 |
| A6 | 3.25427295E-06 | 1.75772294E-06 |
| A7 | -4.96719965E-07 | -2.23465322E-07 |
| A8 | 1.48558090E-08 | -6.07012591E-09 |
| A9 | 1.34106298E-09 | 9.71509954E-10 |
| A10 | -1.26380763E-10 | -L06669048E-11 |
| A11 | 1.66762058E-12 | -1.90180482E-12 |
| A12 | 2.93920926E-13 | 6.79984851E-14 |

TABLE 11-continued

Example 3•Aspherical coefficient

| Si | *3 | *4 |
|---|---|---|
| A13 | −1.45815817E−14 | 1.94513933E−15 |
| A14 | −1.88387252E−16 | −1.23499827E−16 |
| A15 | 2.86889896E−17 | −9.77315587E−19 |
| A16 | −2.67383556E−19 | 1.10857684E−19 |
| A17 | −2.48016874E−20 | 1.20088014E−22 |
| A18 | 4.68100944E−22 | −4.88768786E−23 |
| A19 | 8.19324225E−24 | 4.32717514E−26 |
| A20 | −1.99048598E−25 | 8.34624807E−27 |

TABLE 12

Example 3•Aspherical coefficient

| Si | *23 | *24 |
|---|---|---|
| KA | −5.63072564E−02 | −1.09389829E+00 |
| A3 | 0.00000000E+00 | 0.00000000E+00 |
| A4 | 1.24330043E−04 | 1.25368921E−04 |
| A5 | −2.10442820E−05 | −1.45906588E−05 |
| A6 | 2.37813997E−06 | 7.41898309E−07 |
| A7 | 1.34616481E−08 | 1.87043697E−07 |
| A8 | −2.13485866E−08 | −1.80709804E−08 |
| A9 | 6.62228840E−10 | −1.04828992E−09 |
| A10 | 7.52235606E−11 | 1.34720385E−10 |
| A11 | −4.06672276E−12 | 2.10073064E−12 |
| A12 | −6.27801166E−14 | −4.91971866E−13 |
| A13 | 6.64722570E−15 | 6.32881199E−16 |
| A14 | −1.52145565E−16 | 1.00708290E−15 |
| A15 | 6.31455501E−18 | −8.81384616E−18 |
| A16 | 1.70725501E−19 | −1.18833235E−18 |
| A17 | −2.65921520E−20 | 1.28948504E−20 |
| A18 | 2.94005076E−22 | 7.58032945E−22 |
| A19 | 1.90185395E−23 | −6.29690070E−24 |
| A20 | −3.65849713E−25 | −2.01868555E−25 |

Comparative Example

Figure 17:
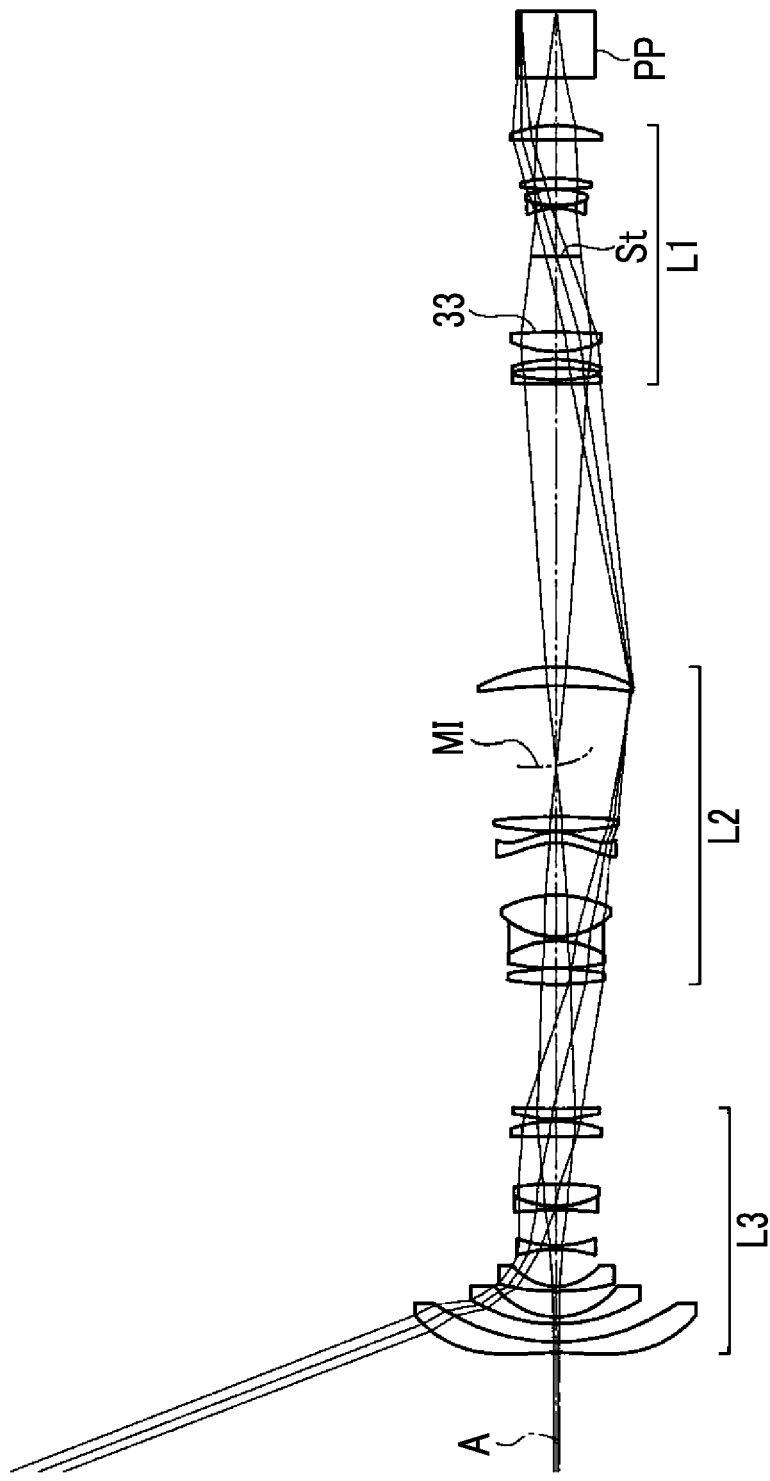
FIG. 17 is a cross-sectional view illustrating a configuration of an optical system according to a comparative example.

Next, an optical system of Comparative Example will be described. FIG. 17 shows a cross-sectional view illustrating a configuration of the optical system of Comparative Example.

The comparative example shown in FIG. 17 is an optical system in which the optical axis is not deflected. The comparative example comprises a first optical system L1, a second optical system L2, and a third optical system L3 in order from the incidence side. The comparative example comprises an aperture stop St, and the first optical system L1 forms an intermediate image MI in front of the second optical system L2. Such a basic configuration of Comparative Example is the same as that of Example 1A shown in FIG. 10. However, unlike each of the above-mentioned examples, the lens shift is not performed in Comparative Example.

Table 13 shows basic lens data of the optical system of Comparative Example, Table 14 shows data about the specifications, and Tables 15 and 16 show data about the aspherical coefficient.

TABLE 13

Comparative Example•Lens Data

| Si | Rj | Di | Ndj | vdj |
|---|---|---|---|---|
| *1 | −96.7641 | 3.5294 | 1.49100 | 57.58 |
| *2 | 79.9115 | 6.0058 | | |
| 3 | 55.9605 | 2.3107 | 1.69680 | 55.53 |
| 4 | 26.3900 | 8.5361 | | |
| 5 | 80.5980 | 1.6863 | 1.90366 | 31.31 |
| 6 | 19.2204 | 12.3125 | | |
| 7 | −44.0849 | 1.2508 | 1.62041 | 60.29 |
| 8 | 38.6195 | 11.8121 | | |
| 9 | −150.4450 | 1.3272 | 1.72047 | 34.71 |
| 10 | 32.4765 | 7.4755 | 1.77250 | 49.60 |
| 11 | −83.1399 | 15.7084 | | |
| 12 | 2095.1730 | 5.1425 | 1.60342 | 38.03 |
| 13 | −47.1410 | 0.7768 | | |
| 14 | 63.8364 | 3.3167 | 1.65412 | 39.68 |
| 15 | 342.2908 | 41.4530 | | |
| 16 | 95.2386 | 5.1595 | 1.49700 | 81.61 |
| 17 | −90.0052 | 0.2638 | | |
| 18 | 91.7007 | 8.9997 | 1.58913 | 61,13 |
| 19 | −32.8046 | 1.4630 | 1.84666 | 23.78 |
| 20 | 28.1004 | 13.8109 | 1.49700 | 81.61 |
| 21 | −41.4820 | 17.5163 | | |
| *22 | −21.7075 | 3.5294 | 1.53158 | 55.08 |
| *23 | −17.6471 | 0.2647 | | |
| 24 | 118.1988 | 4.7964 | 1.80518 | 25.46 |
| 25 | −192.1741 | 43.2873 | | |
| 26 | −176.4717 | 6.4149 | 1.80518 | 25.46 |
| 27 | −56.6739 | 94.1766 | | |
| 28 | 337.6167 | 1.4365 | 1.80610 | 33.27 |
| 29 | 65.3252 | 3.9092 | | |
| 30 | −92.1428 | 2.8625 | 1.83400 | 37.16 |
| 31 | −49.4759 | 2.6980 | | |
| 32 | 39.8955 | 6.4470 | 1.59282 | 68.62 |
| 33 | −236.4273 | 25.2876 | | |
| 34 (St) | ∞ | 15.8549 | | |
| 35 | −23.9639 | 0.9746 | 1.76182 | 26.52 |
| 36 | 28.8242 | 5.4929 | 1.49700 | 81.61 |
| 37 | −31.7664 | 0.0256 | | |
| 38 | 110.0195 | 3.5825 | 1.49700 | 81.61 |
| 39 | −50.8919 | 12.8285 | | |
| 40 | 1607.5201 | 4.8984 | 1.89286 | 20.36 |
| 41 | −40.9461 | 15.9053 | | |
| 42 | ∞ | 22.0500 | 1.51633 | 64.14 |
| 43 | ∞ | | | |

TABLE 14

Comparative Example•Specification

| | |
|---|---|
| \|f\| | 4.52 |
| Bf | 30.42 |
| FNo. | 2.41 |
| 2ω[°] | 138.8 |

TABLE 15

Comparative Example•Aspherical coefficient

| Si | *1 | *2 |
|---|---|---|
| KA | −3.62865906E+00 | −1.44702801E+01 |
| A3 | −6.45283428E−05 | 6.85389588E−04 |
| A4 | 3.40524957E−05 | −2.30957812E−04 |
| A5 | −2.07312746E−06 | 5.22696567E−05 |
| A6 | 6.14091276E−08 | −8.24867898E−06 |
| A7 | 3.56663318E−10 | 9.10734774E−07 |
| A8 | −7.76948134E−11 | −7.13711804E−08 |
| A9 | 1.11372600E−12 | 4.05052265E−09 |
| A10 | 4.48768350E−14 | −1.68556841E−10 |
| A11 | −1.28181897E−15 | 5.14836798E−12 |
| A12 | −7.20567497E−18 | −1.14073898E−13 |
| A13 | 5.24208452E−19 | 1.78303191E−15 |

TABLE 15-continued

Comparative Example·Aspherical coefficient

| Si | *1 | *2 |
|---|---|---|
| A14 | −2.38897159E−21 | −1.86263078E−17 |
| A15 | −7.54466200E−23 | 1.16632583E−19 |
| A16 | 7.13201744E−25 | −3.30906503E−22 |

TABLE 16

Comparative Example·Aspherical coefficient

| Si | *22 | *23 |
|---|---|---|
| KA | −3.70989034E+00 | −2.30676889E+00 |
| A3 | −9.59039305E−04 | −1.04068422E−03 |
| A4 | 2.37762604E−04 | 3.01338690E−04 |
| A5 | −7.45976989E−06 | −2.89985235E−05 |
| A6 | −4.93406099E−06 | 1.21095176E−06 |
| A7 | 9.30981768E−07 | 7.64881042E−09 |
| A8 | −7.44787371E−08 | 6.07953679E−10 |
| A9 | 2.45786675E−09 | −3.27397877E−10 |
| A10 | 2.82295264E−11 | 1.17769941E−11 |
| A11 | −3.46502309E−12 | 4.62827847E−13 |
| A12 | −6.44749480E−14 | −1.73126440E−14 |
| A13 | 1.09663496E−14 | −9.23032294E−16 |
| A14 | −3.70960399E−16 | 1.58559778E−17 |
| A15 | 5.68332610E−18 | 1.63006145E−18 |
| A16 | −3.83055396E−20 | −3.95124933E−20 |

Table 17 to be described below is a table summarizing values of PA of Expression (1) in Examples 1 to 3 and Comparative Example.

TABLE 17

Values of PA

| | Example 1 | Example 2 | Example 3 | Comparative Example |
|---|---|---|---|---|
| DE [mm] | 60.0 | 59.4 | 54.2 | 95.5 |
| f [mm] | 4.63 | 4.62 | 4.63 | 4.52 |
| ω [°] | 71.5 | 73.0 | 76.3 | 69.4 |
| PA = DE/(f × tanω) | 4.34 | 3.93 | 2.85 | 7.94 |

As shown in Table 17, in Examples 1 to 3, the values of PA defined by Expression (1) are in the range of 0.1 or more and 7 or less. For this reason, as compared with Comparative Example, an increase in diameter of the optical system L0 including the emission lens LE is suppressed. Further, in Examples 1 to 3, since the value of PA is equal to or greater than 1, it is possible to suppress distortion from becoming excessively large. Further, in Examples 1 to 3, since the value of PA is equal to or less than 5, an increase in size of the projection lens 10 is further suppressed while ensuring the necessary size of the image circle 40.

FIGS. 18A, 18B, 18C, and 18D each show a distortion diagram of each optical system of Example 1, Example 2, Example 3, and Comparative Example. FIGS. 18A, 18B, 18C, and 18D each show aberration diagrams in a case where the distance (that is, the object distance) is 0.695 m (meters). In FIGS. 18A, 18B, 18C, and 18D, aberrations on the d line is indicated by the solid line. FIG. 18A corresponds to Example 1, FIG. 18B corresponds to Example 2, FIG. 18C corresponds to Example 3, and FIG. 18D corresponds to Comparative Example.

FIGS. 19A to 22B each show a form of distortion which occurs in the projected image 17 in each of the optical systems of Example 1, Example 2, Example 3, and Comparative Example. Distortions of Example 1, Example 2, and Example 3 are all pincushion type.

Figure 19A:
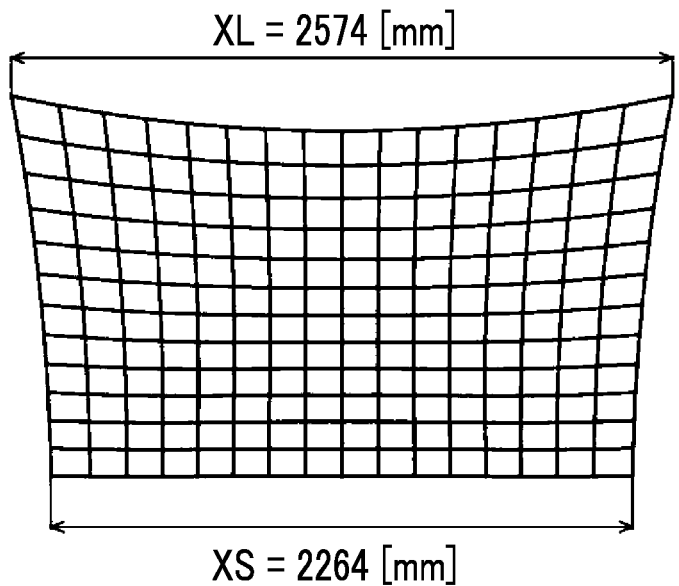
FIGS. 19A and 19B are explanatory diagrams each illustrating a form of distortion according to Example 1.
Figure 19B:
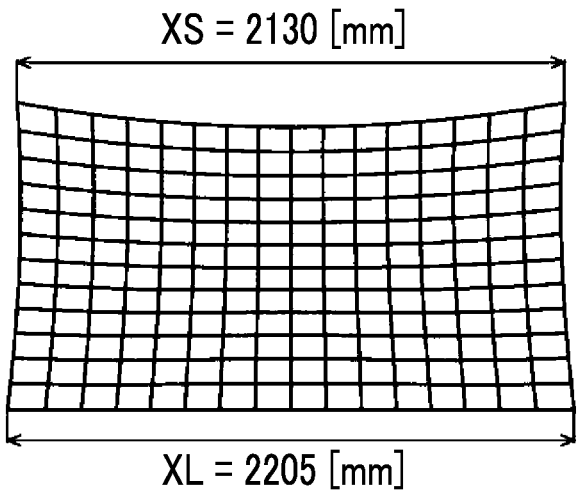

FIGS. 19A and 19B each show a form of distortion of Example 1. FIG. 19A is an example of a projection angle of 90°, and FIG. 19B is an example of a projection angle of 85°. Both FIGS. 19A and 19B are simulation results in a case where the projection surface is set as a plane. As also shown in FIGS. 7A and 7B, XL is a length of the longer straight line of the straight lines connecting both ends of the upper side 17U and the lower side 17L facing each other in the top-bottom direction of the image 17, and XS is a length of the shorter straight line thereof. The meanings of XL and XS are the same as those in Example 2, Example 3 and Comparative Example shown in FIGS. 20A and 20B and below.

Figure 20A:
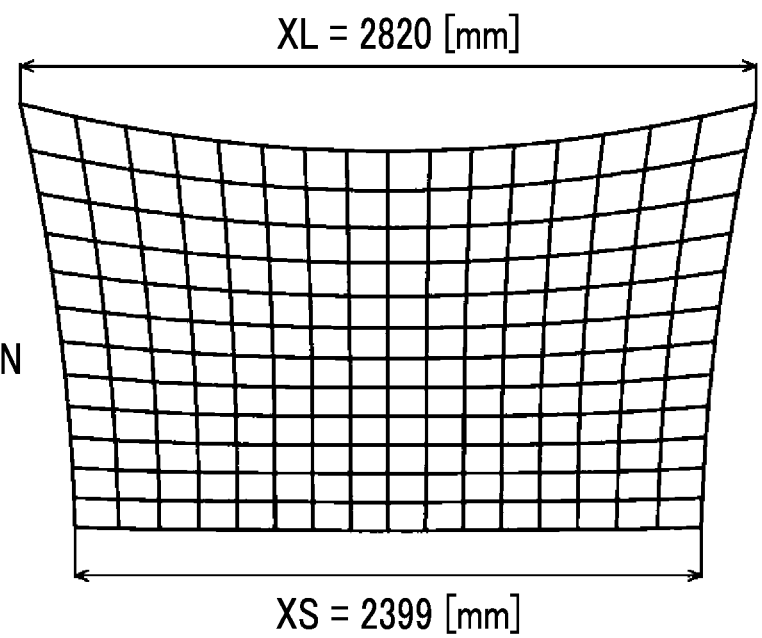
FIGS. 20A and 20B are explanatory diagrams each illustrating a form of distortion according to Example 2.
Figure 20B:
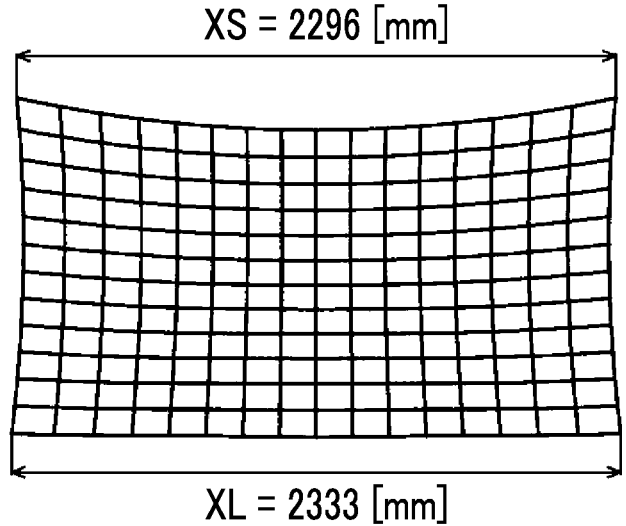

FIGS. 20A and 20B each show a form of distortion of Example 2. FIG. 20A is an example of a projection angle of 90°, and FIG. 20B is an example of a projection angle of 85°. In Each of FIGS. 20A and 20B, the projection surface is calculated as a plane.

Figure 21A:
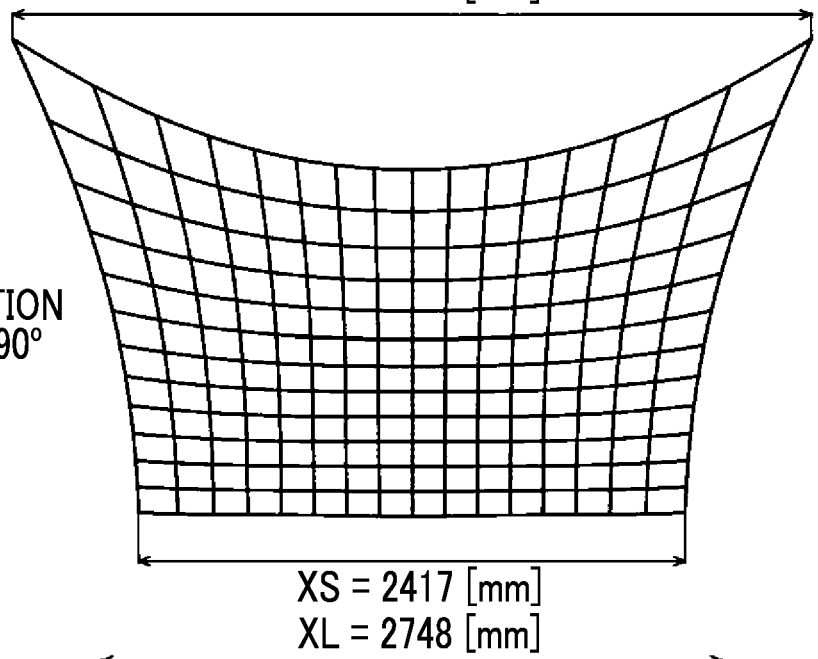
FIGS. 21A, 21B, and 21C are explanatory diagrams each illustrating a form of distortion according to Example 3.
Figure 21B:
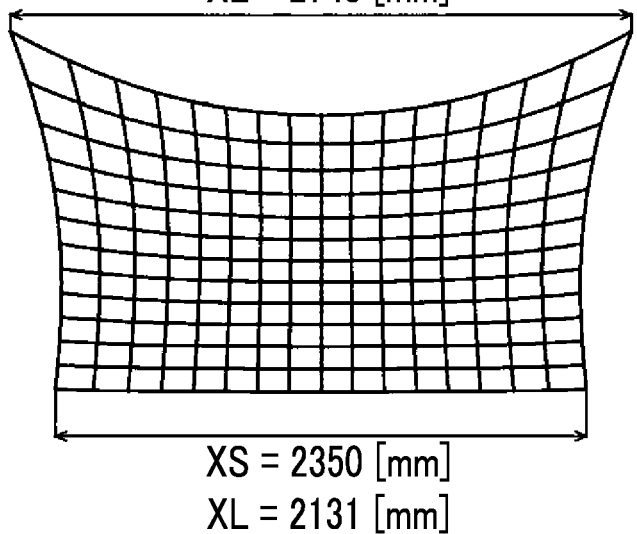
Figure 21C:
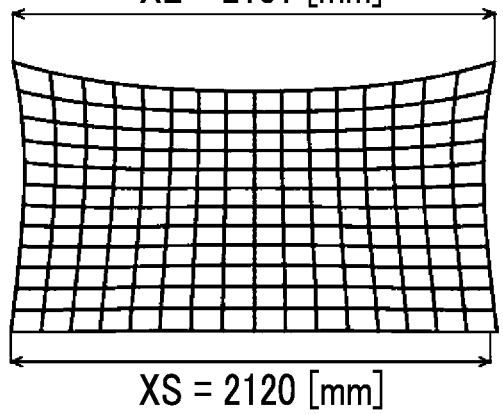

FIGS. 21A, 21B, and 21C each show a form of distortion of Example 3. FIG. 21A is an example of a projection angle of 90°, and FIG. 21B is an example of a projection angle of 85°. Both FIGS. 21A and 21B are simulation results where the projection surface is set as a plane. On the other hand, FIG. 21C is an example in which the projection angle is 85°, as in FIG. 21B, but is a simulation result where the projection surface is set as a curved surface. Specifically, FIG. 21C is an example in which a curved surface having a radius R of 10000 [m (meters)] as a curved surface convex toward the projection direction is set as the projection surface.

As shown in FIG. 1, the windshield 14 often has a shape convex from the inside of the vehicle toward the outside of the vehicle. In a case where the projection lens 10 is provided on the dashboard 13 and the image 17 is projected from the inside of the vehicle onto the windshield 14, the projection surface, which is the inside surface of the windshield 14, has a curved surface convex toward the projection direction. FIG. 21C is an example in which such the projection surface is assumed.

Figure 22A:
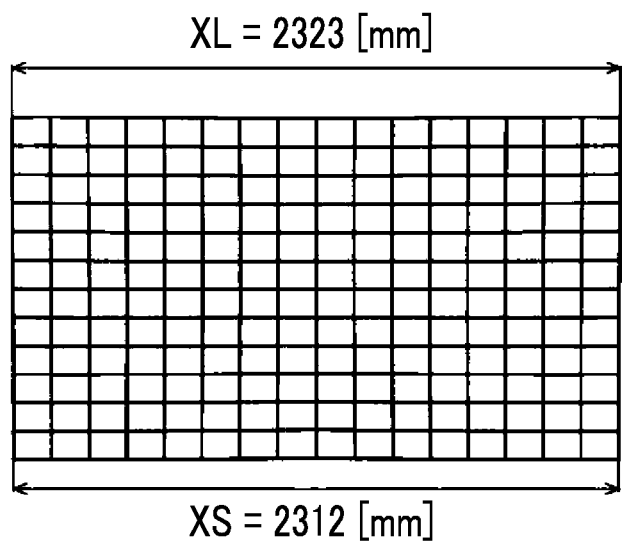
FIGS. 22A and 22B are explanatory diagrams each illustrating a form of distortion in a comparative example.
Figure 22B:
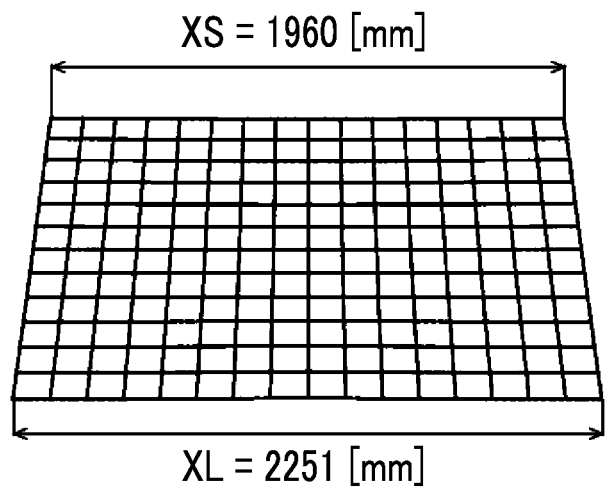

FIGS. 22A and 22B each show a form of distortion in Comparative Example. FIG. 22A is an example of a projection angle of 90°, and FIG. 22B is an example of a projection angle of 85°. Both FIGS. 22A and 22B are simulation results where the projection surface is set as a plane.

Table 18 shows a comparison table summarizing the distortion ratios PD of the examples and comparative examples shown in FIGS. 19 to 22.

TABLE 18

Distortion ratio PD (XL/XS)

| | PD1 Projection angle | PD2 Projection angle | PD1 − PD2 Degree of Elimination |
|---|---|---|---|
| Example 1 | 1.137 | 1.035 | 0.102 |
| Example 2 | 1.092 | 1.016 | 0.076 |
| Example 3 | 1.463 | 1.169 | 0.294 |
| Example 3 (Projection surface is curved surface R = 10000 [m]) | | 1.005 | 0.457 |
| Comparative Example | 1.005 | 1.148 | −0.143 |

In Comparative Example shown in FIGS. 22A and 22B, in a case where the projection angle is 90°, XL, which is the length of the straight line on the upper side 17U side of the image 17, and XS, which is the length of the straight line on the lower side 17L side, are substantially the same. That is, in Comparative Example, in a case where the projection angle is 90°, the image 17 is substantially rectangular, and distortion is suppressed. For this reason, in a case where the projection angle is 85°, the difference between the XS and XL on the upper side 17U side and the lower side 17L side increases, and a state in which distortion occurs is attained.

On the other hand, in each of Examples 1 to 3 shown in FIGS. 19 to 21, in a case where the projection angle is 90° the difference between XL and XS increases as compared with Comparative Example, and distortion occurs. In a case where the projection angle is 85° the difference between XL and XS is reduced and distortion is reduced.

More specifically, in Examples 1 to 3, XL is on the side of the upper side 17U of the image 17, and XS is on the side of the lower side 17L. In a case where the projection angle is set to 85°, XL and XS are reversed in Examples 1 and 2 except for Example 3, XS is on the side of the upper side 17U, and XL is on the side of the lower side 17L.

Further, in each of Examples 1 to 3, a distortion ratio PD2 having a projection angle of 85° is less than a distortion ratio PD1 having a projection angle of 90°. That is, each of Examples 1 to 3 has a distortion characteristic that satisfies Conditional Expression (2).

Further, in each of Examples 1 to 3, the degree of elimination of distortion indicated by the difference between PD1 and PD2 is equal to or greater than 0.05, and Conditional Expression (2-1) is satisfied. For this reason, in Examples 1 to 3, the effect of reducing distortion is large by setting the projection angle to 85° as compared with Comparative Example.

In each of Examples 1 to 3, the value of the distortion ratio PD2 in a case where the projection angle is 85° is 1.2 or less, which satisfies Conditional Expression (3). For this reason, in Examples 1 to 3, the image 17 with relatively little distortion can be projected in a case where the projection angle is 85°. The value of PD2 is more preferably 1.1 or less, as in Example 1 and Example 2. In Example 3, in a case where the projection surface is a curved surface, the value of PD2 can be set to 1.1 or less.

Second Embodiment

Figure 23:
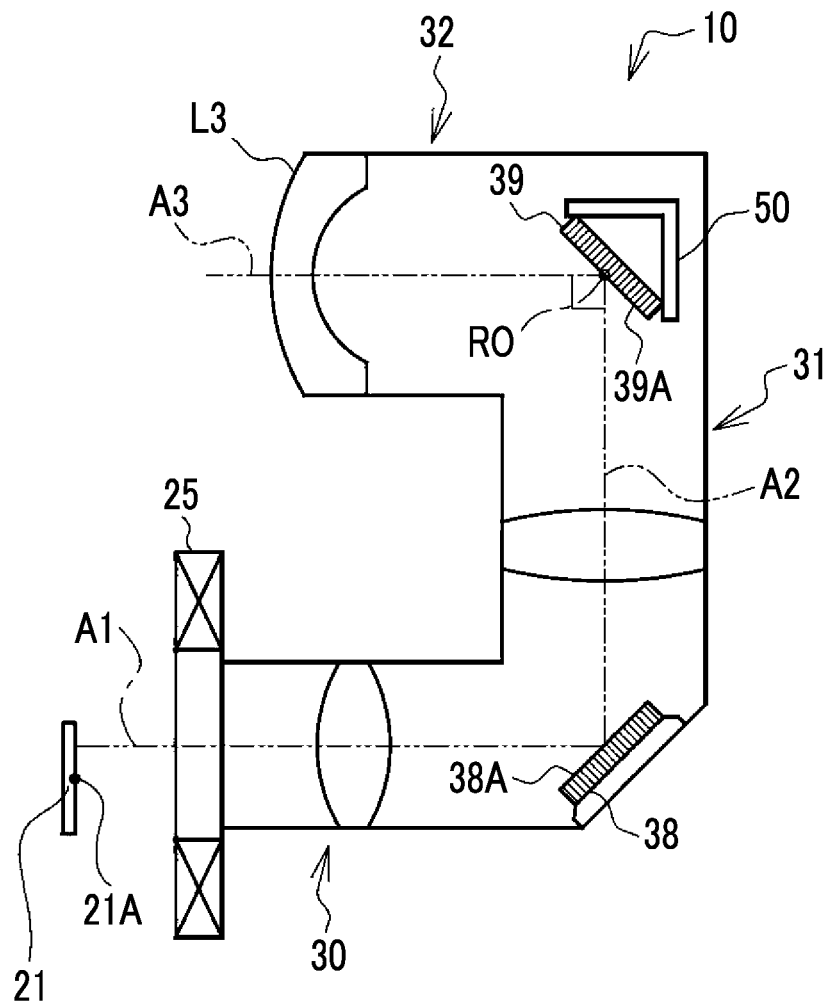
FIG. 23 is an explanatory diagram of a projection lens of a second embodiment.
Figure 24:
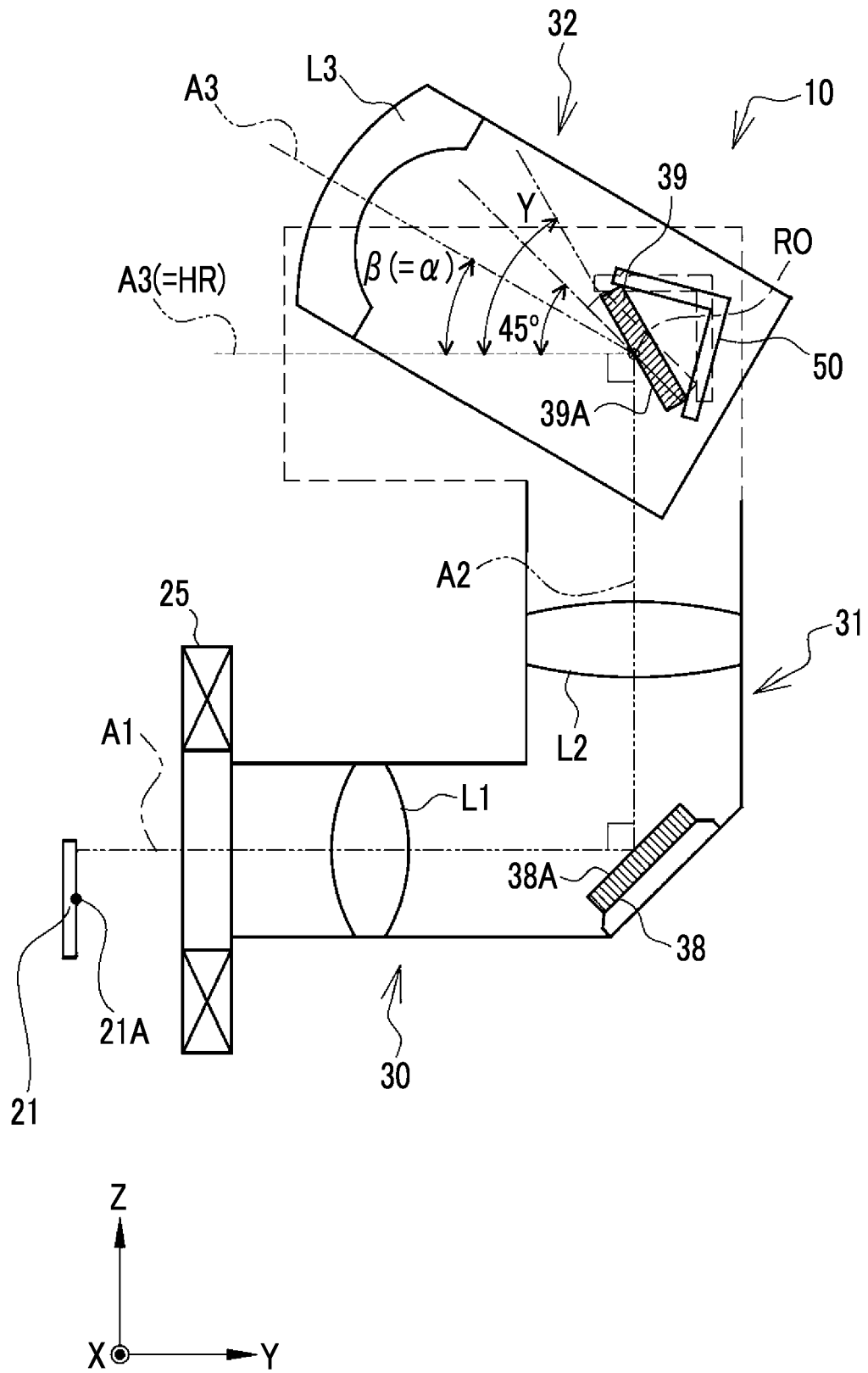
FIG. 24 is an explanatory diagram of the projection lens of the second embodiment in a state where an optical axis is tilted.

The projection lens 10 of the second embodiment shown in FIGS. 23 and 24 has a tilt function of tilting the emission optical axis (in the present example, the third optical axis A3) by rotating the third lens barrel unit 32 with respect to the second lens barrel unit 31. The projection lens 10 of the second embodiment is able to change the tilt angle of the projection lens 10 with respect to the projection surface through the tilt function. Thereby, it is possible to change the projection angle of the projection lens 10 with respect to the projection surface without changing the installation posture of the entire projection apparatus 11.

For example, the tilt function is realized by rotating the third lens barrel unit 32 and the second mirror 39, which is an example of the reflecting part, around the rotation axis RO which extends in the X direction as the rotation center through the intersection of the second optical axis A2 and the emission optical axis (the third optical axis A3 in the present example). Specifically, the third lens barrel unit 32 which holds the third optical system L3 and the mirror holding part 50 which holds the second mirror 39 are rotatably supported by the rotation axis RO.

The projection lens 10 is provided with, for example, a rotation mechanism in which the mirror holding part 50 rotates in conjunction with rotation of the third lens barrel unit 32. Thereby, in a case where the third lens barrel unit 32 is rotated, the mirror holding part 50 also rotates in conjunction with the rotation. The rotation angle of the mirror holding part 50 is set to ½ of the rotation angle of the third lens barrel unit 32. For example, as shown in FIG. 24, in a case where the rotation angle of the third lens barrel unit 32 is β, the rotation angle of the mirror holding part 50 is β/2. This is based on the law of reflection that the incidence angle is equal to the angle of reflection. That is, as shown in FIG. 24, in a case where the second mirror 39 rotates in the direction in which the angle formed by the second optical axis A2 and the third optical axis A3 increases (clockwise in the present example), the incidence angle of incidence onto the reflective surface 39A of the second mirror 39 increases by the rotation angle of rotation of the second mirror 39. According to the law of reflection, as the incidence angle increases, the reflection angle also increases by the same angle. For this reason, in a case where the rotation angle of the second mirror 39 is β/2, the rotation angle of the third optical axis A3 is D, which is twice β/2.

Providing the projection lens 10 with the tilt function has the following merits. The angle of the windshield 14 provided on the automobile 12 may change with respect to the dashboard 13 depending on the vehicle type or model. By providing the tilt function, it is possible to easily adjust the projection angle according to the inclination of the windshield 14 which changes depending on the vehicle type or model.

Further, in the projection lens 10 having the tilt function shown in FIG. 24, assuming that the tilt angle of the emission optical axis (third optical axis A3 in the present example) of the emission lens LE with respect to the horizontal direction HR in a case where the emission lens LE is seen in a side view is α and the inclination angle of the reflective surface 39A of the second mirror 39 with respect to the horizontal direction HR is γ. Conditional Expression (6) is satisfied.

$$\gamma - 45° = \alpha/2 \qquad (6)$$

The precondition for satisfying Conditional Expression (6) is that the third optical axis A3 (an example of the emission optical axis) is orthogonal to the second optical axis A3 in the initial state, and the third optical axis A3 in the initial state extends in the horizontal direction HR.

Although the details will be to be described later (refer to FIGS. 29 and 30), the tilt angle β is a relative tilt angle of the third optical axis A3 with respect to the third optical axis A3 in the initial state, and the tilt angle α is an absolute tilt angle with respect to the horizontal direction HR of the third optical axis A3 with respect to the horizontal direction HR. In the example of FIG. 24, the third optical axis A3 in the initial state extends in the horizontal direction HR, and the reference points of the tilt angle β and the tilt angle α are the same. Therefore, the tilt angle β coincides with the tilt angle α. (That is, β=α). Further, in the example of FIG. 24, in a case where the third optical axis A3 is in the initial state (that is, in a case where A3=HR), both the absolute tilt angle α and the relative tilt angle β of the third optical axis A3 are 0°.

Further, as described above, in FIG. 24, the second mirror 39 deflects the second optical axis A2 by 90° to form the third optical axis A3. For this reason, the inclination angle γ of the reflective surface 39A of the second mirror 39 is 450 in the initial state in which the third optical axis A3 extends in the horizontal direction HR. Further, as described above, the rotation angle of the second mirror 39 is ½ of the rotation angle of the third lens barrel unit 32 including the emission lens LE. For this reason, in a case where the third optical axis A3 in the initial state rotates clockwise, the rotation angle of the second mirror 39 based on the initial state of the reflective surface 39A is ½ of the absolute tilt angle α (that is, α/2) of the third optical axis A3. Here, since the inclination angle γ of the reflective surface 39A of the second mirror 39 in the initial state is 45°, the rotation angle of the reflective surface 39A based on the initial state is a value obtained by subtracting 45°, which is the inclination angle γ in the initial state before rotation, from the inclination angle γ after rotation. Therefore, in the projection lens 10 of the example of FIG. 24, the relationship between the absolute tilt angle α of the third optical axis A3 and the inclination angle γ of the reflective surface 39A satisfies Conditional Expression (6). In Conditional Expression (6), in a case where the difference between the value of γ−45° and the value of α/2 is within 1°, Conditional Expression (6) is satisfied.

Third Embodiment

In a case where the projection angle is adjusted, it may be necessary to adjust the projection position of the image 17. The third embodiment shown in FIGS. 25 to 28 is a form in which the range of the amount of shift according to the projection angle is optimized while an increase in size of the projection lens 10 is suppressed in a case where the projection position of the image 17 is adjusted by using the lens shift function in accordance with the adjustment of the projection angle.

First, it is necessary to adjust the projection angle in a case where, for example, the inclination angle of the windshield 14 differs depending on the vehicle type or the like. As compared with the windshield 14 of FIG. 25, the windshield 14 of FIG. 26 is inclined to be rotated in a clockwise direction. In a case where the inclination of the windshield 14 is different in such a manner, the projection lens 10 is adjusted such that a projection angle AG is an appropriate angle of less than 90° according to the respective inclinations of the windshield 14 of FIGS. 25 and 26. As described above, the projection lens 10 of the present example is designed such that the effect of suppressing distortion is enhanced in a case where the projection angle AG is 85°. Therefore, an appropriate angle is, for example, 85°.

Figure 25:
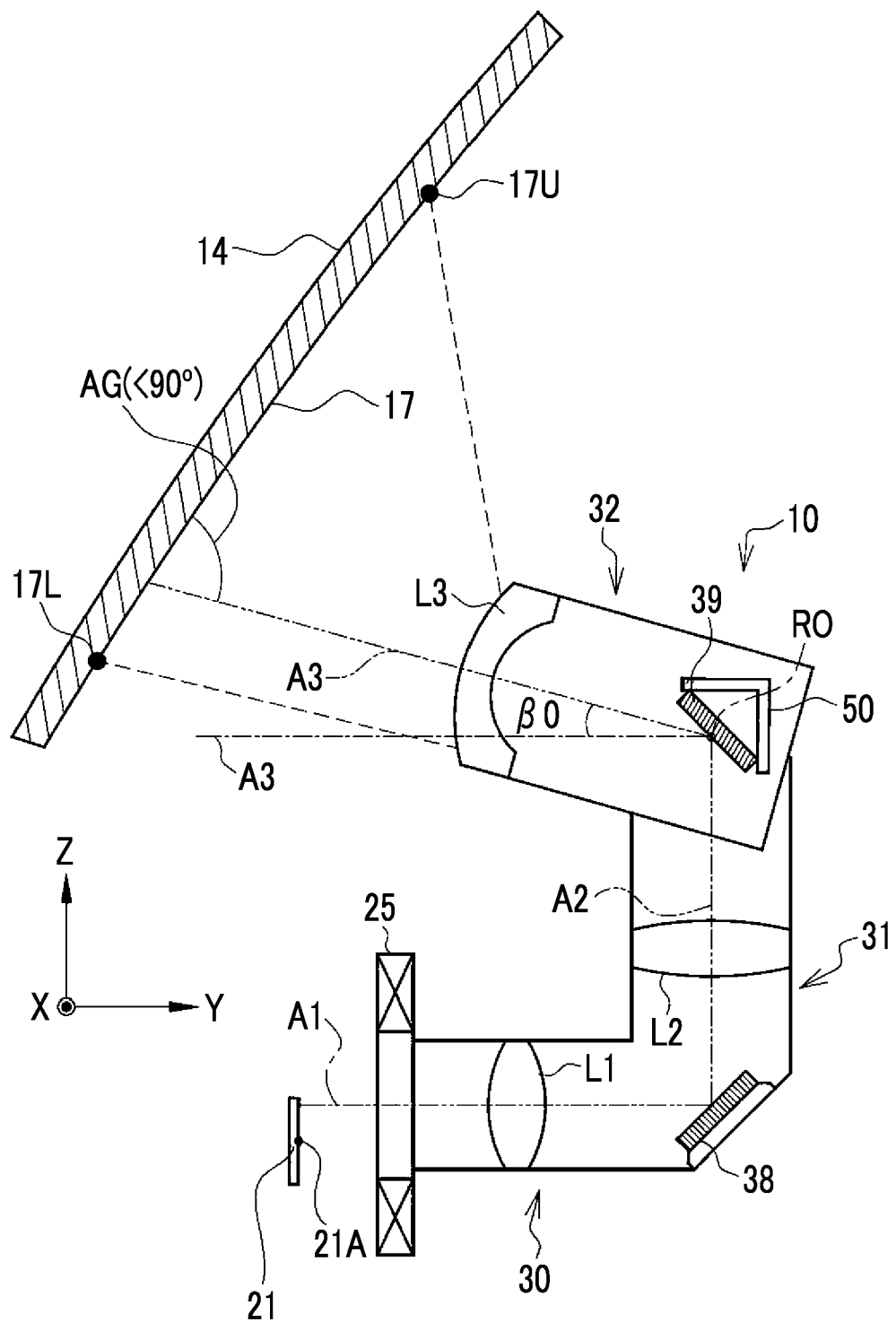
FIG. 25 is an explanatory diagram of a projection lens according to a third embodiment.
Figure 26:
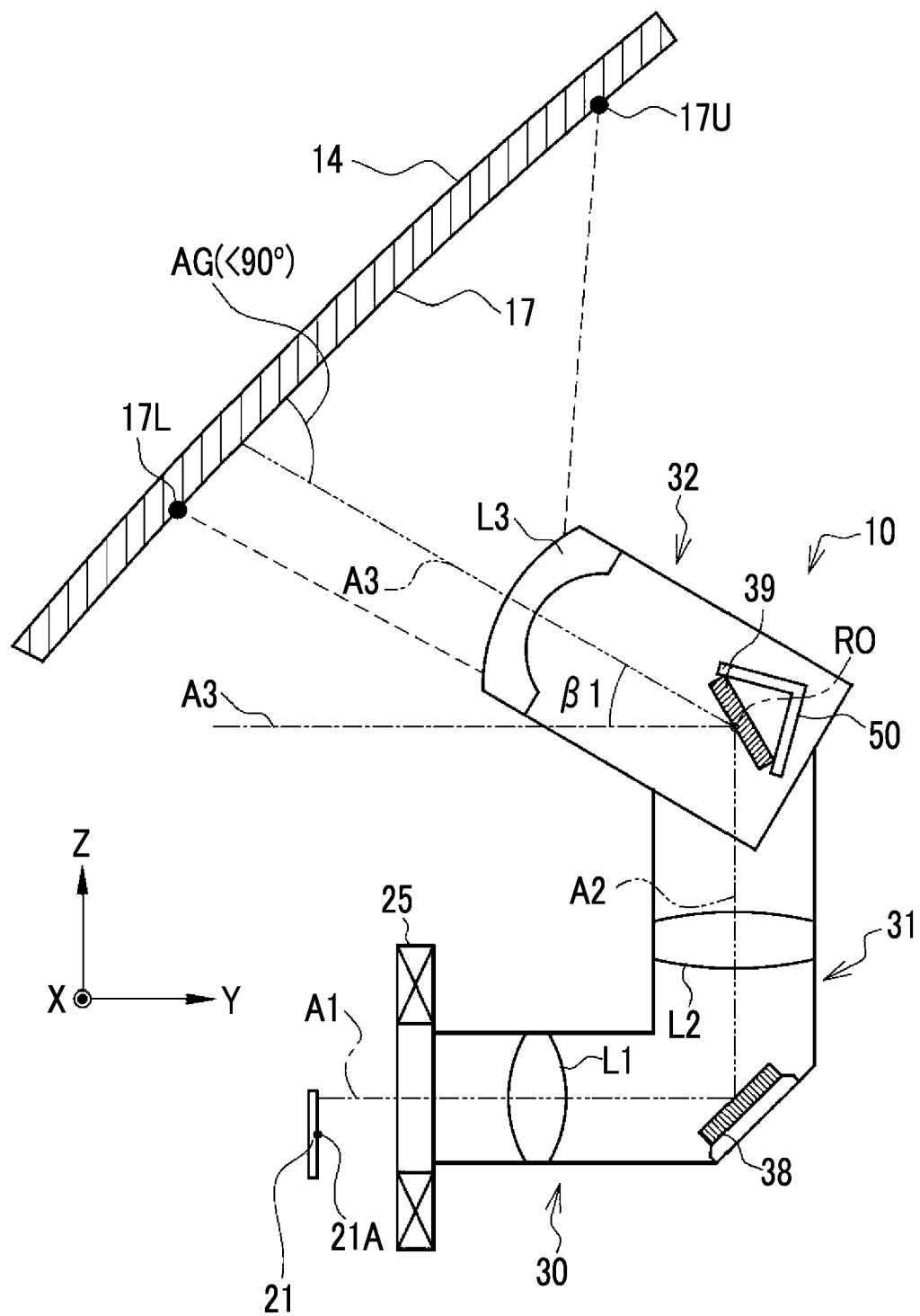
FIG. 26 is an explanatory diagram illustrating a state in which the projection lens of FIG. 25 is further tilted.

In the example of FIG. 25, the projection lens 10 is set to a tilt angle β0 at which the projection angle AG is 850 by rotating the third lens barrel unit 32 in the clockwise direction. Thereby, the projection angle AG is adjusted to 85°. In a case where the projection angle AG is adjusted to 85° in accordance with the inclination of the windshield 14 in FIG. 26, the projection angle AG is less than 850 in a case where the tilt angle β0. For this reason, by rotating the third lens barrel unit 32 further clockwise than in the state of FIG. 25, the tilt angle β1 larger than the tilt angle θ is set. Thereby, the projection angle AG is adjusted to 85°.

However, as shown in FIG. 26, in a case where the tilt angle β1 is set to be larger than the tilt angle β0, the projection position of the image 17 may be excessively high. In such a case, the lens shift function is used to adjust the projection position of the image 17.

Figure 27:
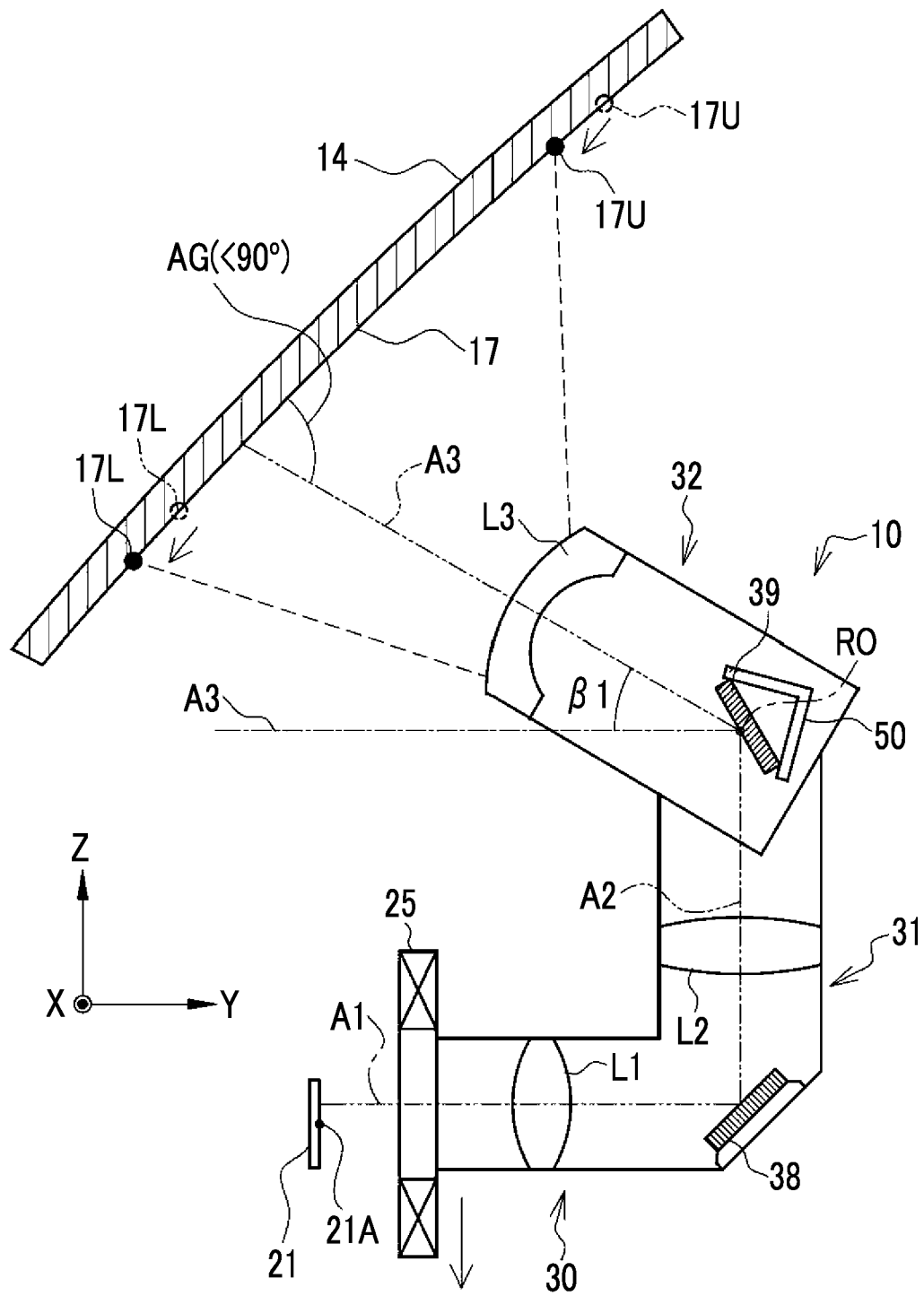
FIG. 27 is an explanatory diagram illustrating a state in which a projection position of the projection lens of FIG. 26 is changed.

In FIG. 27, the projection position of the image 17 is shifted downward as shown by an arrow by using the lens shift function by the lens shift mechanism 25 from the state of FIG. 26 (that is, the state of the tilt angle β1). Thereby, the projection position of the image 17 can be adjusted to an appropriate position.

The more vehicles equipped with the projection lens 10, the more scenes using the lens shift function in accordance with adjustment of the projection angle. The larger the maximum amount of shift, which is the adjustment range of the lens shift function, the better the usability since the projection lens 10 can be adapted to various vehicle models. However, an increase in the maximum amount of shift in the lens shift function is accompanied by an increase in the diameter of the image circle 40 shown in FIG. 6. As described above, the increase in diameter of the image circle 40 leads to an increase in diameter and size of the projection lens 10.

Therefore, by satisfying the following conditions, the projection lens 10 of the third embodiment ensures a amount of shift which can withstand practical use while suppressing an increase in size.

First, similarly to the projection lens 10 of each of the above-mentioned embodiments, in the projection lens 10 of the third embodiment, the first optical axis A1 which is the incidence optical axis is shifted in the top-bottom direction (Z direction in the present example) with respect to the center 21A of the screen of the electrooptic element 21. The reason for this is that, as described above, in addition to enabling the launch system to perform projection of the image 17, in a case where the projection angle is less than 90°, as compared with the case where the projection angle is 90°, the effect of reduction in distortion is exerted.

Figure 28:
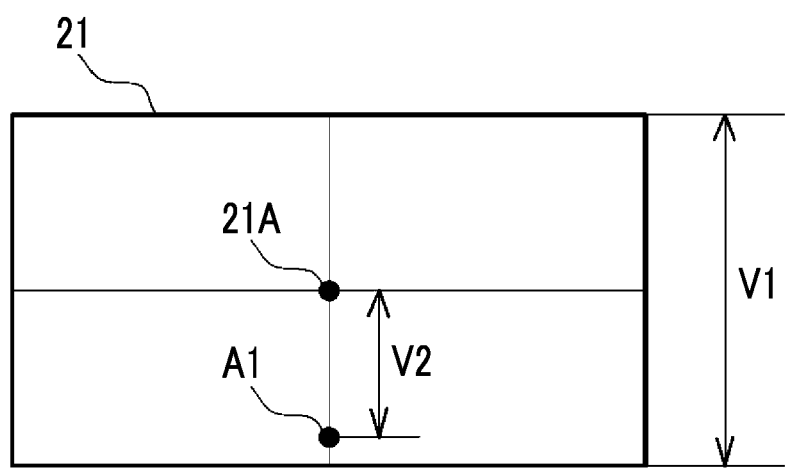
FIG. 28 is an explanatory diagram of V1 and V2.
Figure 29:
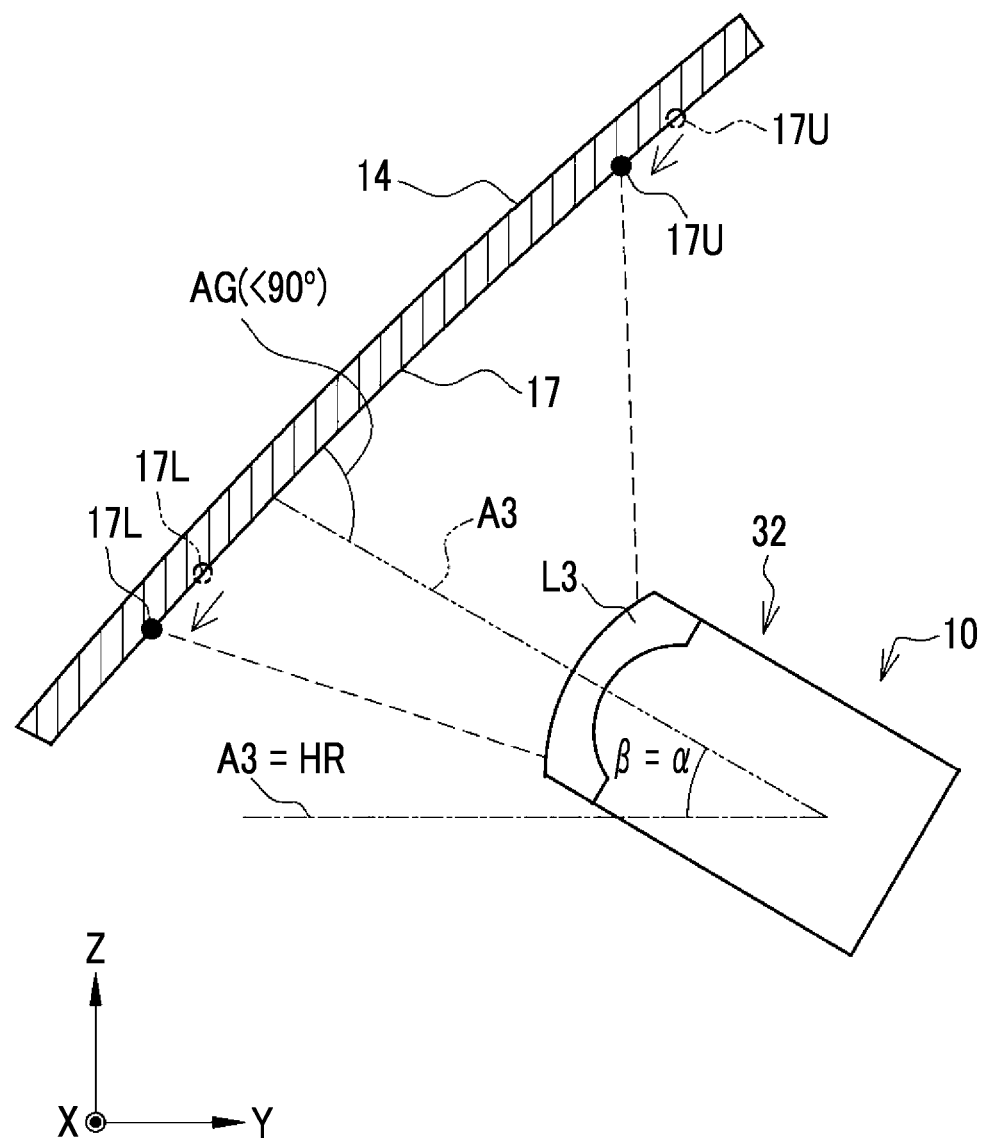
FIG. 29 is an explanatory diagram of a tilt angle $\alpha$.

Here, as shown in FIG. 28, it is assumed that the length of the screen of the electrooptic element 21 in the top-bottom direction (Z direction in the present example) is V1, and the maximum amount of shift of the first optical axis A1 which is the incidence optical axis with respect to the center position 21A of the screen is V2. Then, it is assumed that the projection distance between the emission lens LE and the windshield 14, which is the projection surface, is LP (refer to FIG. 4), and the dimensionless value of LP is LPn. Further, it is assumed that the tilt angle of the emission optical axis (third optical axis A3 in the present example) in the horizontal direction in a case where the emission lens LE is seen in a side view is α. As shown in FIG. 29, the tilt angle α is an angle of the emission optical axis (third optical axis A3 in the present example) with respect to the horizontal direction HR. In a case where the third optical axis A3 extends in the horizontal direction HR, the tilt angle α and the tilt angle β due to the tilt function of the projection lens 10 coincide with each other. That is, the tilt angle β is a relative tilt angle of the third optical axis A3 based on the initial state in which the second optical axis A2 and the third optical axis A3 are orthogonal to each other in the projection lens 10 having the rotation function of the third optical axis A3. In other words, the tilt angle β is an angle at which the third optical axis A3 after rotation rotates with respect to the third optical axis A3 in the initial state. On the other hand, the tilt angle α is an absolute tilt angle with respect to the horizontal direction HR of the third optical axis A3 based on the horizontal direction HR.

Figure 30:
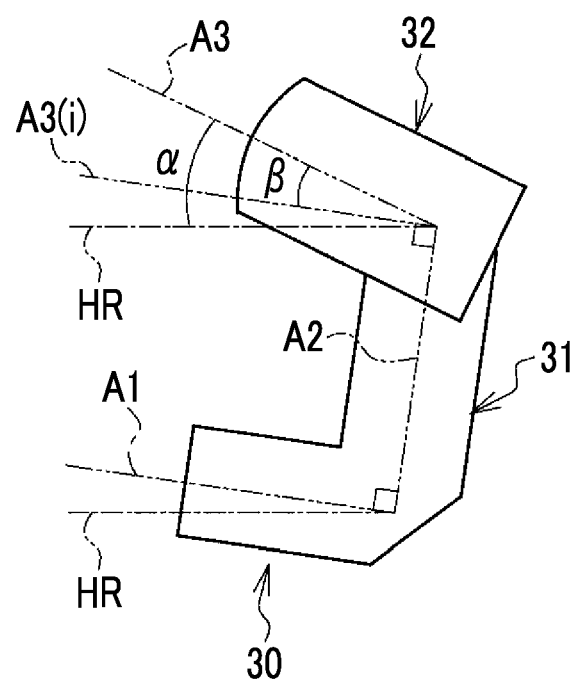
FIG. 30 is an explanatory diagram of the tilt angle $\alpha$ and a tilt angle $\beta$.

For this reason, as in the projection lens 30 shown in FIG. 30, in a case where the direction in which the third optical axis A3 in the initial state extends is different from the horizontal direction HR, the absolute tilt angle α does not coincide with the relative tilt angle β. In FIG. 30, the projection lens 10 is provided with a posture in which the second optical axis A2 is tilted backward with respect to the vertical direction, more specifically, a posture in which the entire projection lens 10 is rotated in the clockwise direction with the intersection of the second optical axis A2 and the third optical axis A3 set as a base point. For this reason, assuming that the third optical axis A3 in a state orthogonal to the second optical axis A2 is the third optical axis A3 (i) in the initial state, the third optical axis A3 (i) in the initial state is tilted clockwise with respect to the horizontal direction HR as the entire projection lens 10 is tilted backward. The relative tilt angle β is a rotation angle with respect to the third optical axis A3 (i) in the initial state. Therefore, as shown in FIG. 30, in a case where the third optical axis A3 is tilted clockwise on the basis of the initial state, the absolute tilt angle α of the third optical axis A3 is a value greater than the relative tilt angle β.

In a case where the absolute tilt angle α is defined as described above, in the projection lens 10 of the third embodiment, the value of PS defined by Expression (4) satisfies Conditional Expression (5).

$$PS = 100 \times V2/V1 \qquad (4)$$

$$35 - 3.5 \times LPn \times \alpha < PS < 70 - LPn \times \alpha \qquad (5)$$

Here, the unit of V1, V2, and L is [m (meters)]. α is an angle and is a dimensionless amount, but the unit is degrees [°].

In Expression (4), PS indicates a ratio of the maximum amount of shift V2 to the length V1 in the top-bottom direction of the electrooptic element 21. For example, in a case where V1 is 0.02 [m (meters)] and V2 is 0.01 [m (meters)], the value of PS is 50. In a case where the value of PS is 50, it means that the electrooptic element 21 can be shifted by half the length V1 in the top-bottom direction. In a case where the value of PS is 70, the amount of shift is 70% of V1, and the first optical axis A1 can be shifted to a position off the screen (refer to FIGS. 12A and 12B). In a case where the maximum amount of shift V2 is increased in such a manner, the diameter of the image circle 40 has to be increased. Therefore, an increase in the maximum amount of shift V2 leads to an increase in the diameter and size of the projection lens 10.

In Conditional Expression (5), the numerical value "35" relating to the lower limit of PS and the numerical value "70" relating to the upper limit of PS are values which are set assuming that the tilt angle α is 0°. In addition, each numerical value is a value obtained by converting the amount of shift necessary for projecting the launch system into PS defined by Expression (4). That is, the numerical values "35" and "70" are values which are set in accordance with the necessary amount of shift assumed in a case where the tilt angle α is 0°.

In particular, in consideration of the use of the projection lens 10 for in-vehicle use as in the present example, in a case where PS is excessively small, that is, in a case where the maximum amount of shift V2 is excessively small, it is necessary to ensure a certain amount of shift toward the upper side of the image 17 in the launch system. For example, in a case where the projection lens 10 is provided on the dashboard 13, it is considered that the projection position of the image 17 is launched upward with respect to the emission optical axis of the emission lens LE (the third optical axis A3 in the present example). In a case where the amount of launch of the projection position is small, it is necessary to raise the installation height of the projection lens 10 in order to shift the projection position of the image 17 upward. Then, since the projection lens 10 protrudes greatly from the dashboard 13 toward the windshield 14, there arises a problem in that the lens barrel of the projection lens 10 interferes with viewing the image 17. For this reason, as the lower limit value of PS, a lower limit value of "35" is set in a case where the tilt angle α is "0°". Further, as described above, it is easy to use in a case where the maximum amount of shift V2 is large. However, an increase in the maximum amount of shift V2 leads to an increase in the size of the projection lens 10. Therefore, in a case where the tilt angle α is "0°", the upper limit value of "70" is set as the upper limit value of PS.

Conditional Expression (5) is defined in consideration of how much it is appropriate to reduce the amount of shift in a case where the tilt angle α is increased. As described with reference to FIGS. 26 and 27, the projection lens 10 adjusts the projection position of the image 17 by using the lens shift function in a case where the tilt angle β relating to the tilt angle α is increased. From the viewpoint of how much the amount of shift should be reduced in the adjustment of the projection position accompanying an increase in the tilt angle α in such a manner, the term "−3.5×Ln×α" which defines the lower limit in Conditional Expression (5), and the term "−Ln×α" which defines the upper limit are set.

By satisfying Conditional Expression (5), the amount of shift of the projection lens 10 decreases as the tilt angle α increases. Thereby, the projection lens 10 has a maximum amount of shift in a case where the tilt angle α is "0°". Thus, the amount of shift does not increase even in a case where the tilt angle α is increased. For this reason, it is possible to suppress an increase in diameter and size of the projection lens 10.

Further, it is more preferable that the value of PS satisfies Conditional Expression (5-1).

$$40 - 2.5 \times Ln \times \alpha < PS < 60 - 1.5 \times Ln \times \alpha \qquad (5-1)$$

By satisfying Conditional Expression (5-1) in addition to Conditional Expression (5), the following effects can be further obtained. First, since the lower limit value is higher than that of Conditional Expression (5), a more practical maximum amount of shift V2 is ensured. Further, since the upper limit value is lowered, it contributes to reduction in size of the projection lens 10.

Although the description has been made under the premise of the tilt function of the emission optical axis in the third embodiment, combination with the tilt function is not essential. For example, the third embodiment can be applied to a projection lens having an optical system in which the optical axis is not deflected. The tilt angle α of the optical axis is adjusted by tilting the installation posture of the projection lens 10 with respect to the windshield 14. Then, the projection position of the image 17 is adjusted by the lens shift function.

Further, also in the first embodiment, the deflecting optical system in which the optical axis is deflected has been described as an example, but the technique according to the first embodiment may be applied to a projection lens having an optical system in which the optical axis is not deflected.

Figure 31A:
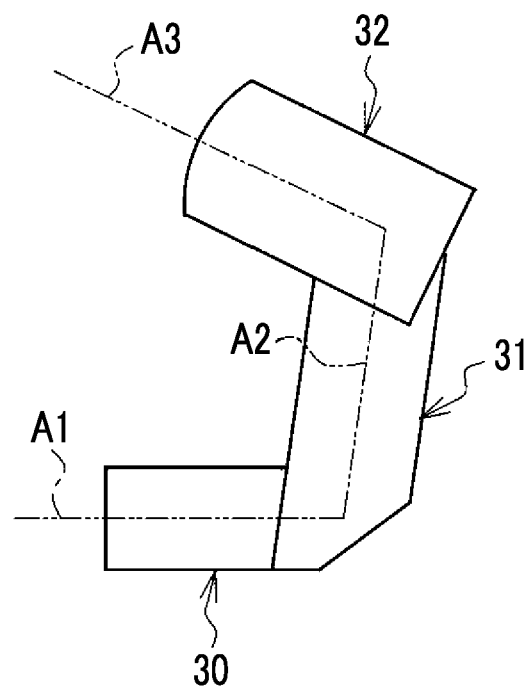
FIGS. 31A and 31B are explanatory diagrams each illustrating a modification example of the projection lens.
Figure 31B:
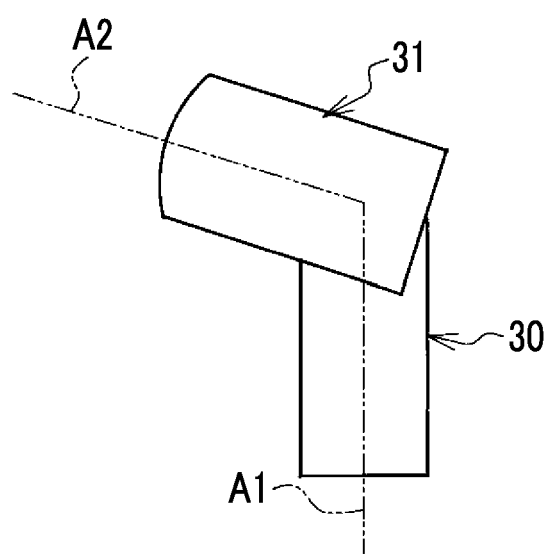

Further, the above-mentioned embodiment has described an example of rotation of the third optical axis A3 among the three optical axes of the first optical axis A1, the second optical axis A2, and the third optical axis A3. For example, the aspect shown in FIGS. 31A and 31B may be employed. The projection lens shown in FIG. 31A has an aspect in which not only the third optical axis A3 but also the second optical axis A2 can be rotated. Further, the number of optical axes may be other than three. In addition, the two-axis configuration of the first optical axis A1 and the second optical axis A2 may be used as in the projection lens shown in FIG. 31B. In such a case, the second optical axis A2, which is the emission optical axis, is rotated with respect to the first optical axis A1.

In the above-mentioned embodiment, the automobile 12 is exemplified as the transportation equipment, but the present disclosure is not limited to this. The transportation equipment may be a construction vehicle, a railroad, a ship, an airplane, or the like. Further, in the above-mentioned embodiment, the projection lens 10 for transportation equipment has been exemplified, but the present disclosure is not limited to this. For example, a projection lens intended for outdoor use may be used.

In the above-mentioned embodiment, an example in which the image 17 is projected onto the windshield 14 by the projection apparatus 11 is shown, but the technique of the present disclosure is not limited to this. For example, the image 17 may be projected onto the rear glass, the door glass, or the like instead of the windshield 14. Further, the image 17 does not have to be projected on the windshield 14, but may be projected on a projection curtain which is provided in the passenger compartment of the automobile 12. In such a case, the projection curtain is the projection surface.

As the electrooptic element 21, a transmissive electrooptic element using a liquid crystal display (LCD) element may be used instead of the DMD. Further, instead of the DMD, a panel using a self-luminous element such as a light emitting diode (LED) or an organic electroluminescence (EL) may be used. Further, a total internal reflective type mirror may be used instead of the first mirror 38 and the second mirror 39 which are the specular reflective type in the above-mentioned embodiment.

The above-mentioned embodiment has described an example in which a laser light source is used as the light source 22. However, the present invention is not limited to this, and a mercury lamp, an LED, or the like may be used as the light source 22. Further, in the above-mentioned embodiment, the blue laser light source and the yellow phosphor are used. However, the present invention is not limited to this, and a green phosphor and a red phosphor may be used instead of the yellow phosphor. Further, a green laser light source and a red laser light source may be used instead of the yellow phosphor.

The technique of the present disclosure is able to also appropriately combine the various embodiments described above with various modifications. Further, it is apparent that the technique is not limited to the above-mentioned embodiment, and various configurations can be adopted without departing from the scope thereof.

The contents described and illustrated above are detailed descriptions of the parts relating to the technique of the present disclosure, and are merely examples of the technique of the present disclosure. For example, the above description of the configuration, function, effect, and advantage is an example of the configuration, function, effect, and advantage of a part relating to the technique of the present disclosure. Therefore, it is needless to say that unnecessary parts may be deleted, new elements may be added, or replacements may be made in the described contents and illustrated contents shown above without departing from the technical scope of the present disclosure. In addition, in order to avoid complications and facilitate understanding of the parts relating to the technique of the present disclosure, in the description contents and the illustrated contents shown above, the description about common technical knowledge and the like which require special explanation in order to enable the implementation of the technique of the present disclosure is not given.

As used herein, "A and/or B" is synonymous with "at least one of A or B". That is, "A and/or B" means that it may be only A, only B, or a combination of A and B. Further, in the present specification, in a case where three or more matters are connected and expressed by "and/or", the same concept as "A and/or B" is applied.

All documents, patent applications, and technical standards described in the present specification are incorporated into the present specification by reference to the same extent as in a case where the individual documents, patent applications, and technical standards were specifically and individually stated to be incorporated by reference.

What is claimed is:

1. A projection lens having an optical system comprising:
an incidence lens on which light from an electrooptic element is incident; and an emission lens that is positioned closest to a magnification side and emits an image toward a projection surface,
wherein an incidence optical axis of the incidence lens is shifted in a first direction orthogonal to the incidence optical axis with respect to a center of a screen of the electrooptic element,
a projection angle, which is an angle of an emission optical axis of the emission lens with respect to the projection surface, is less than 90°, and
assuming that
an effective diameter of the emission lens is DE,
a focal length of an entire optical system including the emission lens is f, and
a half angle of view of the entire optical system is ω,
ω is equal to or greater than 60°, and
a value of PA defined by Expression (1) is equal to or greater than 0.1 and equal to or less than 7, $$PA=DE/(f \times \tan \omega) \ldots (1),$$

wherein the value of PA is equal to or greater than 0.5 and equal to or less than 7.

2. The projection lens according to claim 1, wherein the value of PA is equal to or greater than 1 and equal to or less than 5.

3. The projection lens according to claim 1, wherein the projection surface is convex in a projection direction.

4. The projection lens according to claim 1, further comprising a reflecting part that deflects an optical axis,
wherein the reflecting part deflects the optical axis on an incidence side of the reflecting part toward the emission optical axis.

5. The projection lens according to claim 4, wherein the emission optical axis is tilted by rotating the reflecting part.

6. The projection lens according to claim 1, wherein
the optical system further includes a reflecting part that has a reflective surface which deflects an optical axis of light incident from an incidence lens side and emits the light to an emission lens side, and
assuming that
a tilt angle of an emission optical axis of the emission lens with respect to a horizontal direction is α in a case where the emission lens is seen in a side view, and
an inclination angle of the reflective surface with respect to the horizontal direction is γ,
Conditional Expression (6) is satisfied, $$\gamma - 45° = \alpha/2 \ldots (6).$$

7. A projection apparatus comprising the projection lens according to claim 1.

8. A projection lens having an optical system comprising:
an incidence lens on which light from an electrooptic element is incident, and an emission lens that is positioned closest to a magnification side and emits an image toward a projection surface,
wherein an incidence optical axis of the incidence lens is shifted in a first direction orthogonal to the incidence optical axis with respect to a center of a screen of the electrooptic element,
a projection angle, which is an angle of an emission optical axis of the emission lens with respect to the projection surface, is less than 90°, and
assuming that
an effective diameter of the emission lens is DE,
a focal length of an entire optical system including the emission lens is f, and
a half angle of view of the entire optical system is ω,
ω is equal to or greater than 60°, and
a value of PA defined by Expression (1) is equal to or greater than 0.1 and equal to or less than 7, $PA=DE/(f \times \tan \omega) \ldots (1)$, wherein in a case where, among straight lines connecting both ends of each side of two opposite sides of the image projected on the projection surface in the first direction, a length of a longer straight line is XL, a length of a shorter straight line is XS, and XL/XS, which is a ratio of XL to XS, is a distortion ratio,
assuming that
the distortion ratio is PD1 in a case where the projection angle is 90°, and
the distortion ratio is PD2 in a case where the projection angle is 85°,
values of PD1 and PD2 satisfy Conditional Expression (2), $PD1>PD2 \ldots (2)$.

9. The projection lens according to claim 8, wherein the values of PD1 and PD2 further satisfy Conditional Expression (2-1), $PD1-PD2 \geq 0.05 \ldots (2\text{-}1)$.

10. The projection lens according to claim 8, wherein the value of PD2 further satisfies Conditional Expression (3), $PD2 \leq 1.2 \ldots (3)$ 11. A projection apparatus comprising the projection lens according to claim 8.

12. A projection as having an optical system comprising:
an incidence lens on which light from an electrooptic element is incident; and an emission lens that is positioned closest to a magnification side and emits an image toward a projection surface,
wherein an incidence optical axis of the incidence lens is shifted in a first direction orthogonal to the incidence optical axis with respect to a center of a screen of the electrooptic element,
a projection angle which is an angle of an emission optical axis of the emission lens with respect to the projection surface, is less than 90°, and
assuming that
an effective diameter of the emission lens is DE
a focal length of an entire optical system including the emission lens is f, and
a half angle of view of the entire optical system is ω,
ω is equal to or greater than 60°, and
a value of PA defined by Expression (1) is equal to or greater than 0.1 and equal to or less than 7, $PA=DE/(f \times \tan \omega) \ldots (1)$, wherein assuming that
a length of the screen of the electrooptic element in the first direction is V1,
a maximum amount of shift of the incidence optical axis with respect to a center position of the screen is V2,
a projection distance between the emission lens and the projection surface is LP,
a dimensionless value of LP is LPn, and
a tilt angle of the emission optical axis with respect to a horizontal direction is α in a case where the emission lens is seen in a side view,
a value of PS defined by Expression (4) satisfies Conditional Expression (5), $PS=100 \times V2/V1 \ldots (4)$, and $35-3.5 \times LPn \times \alpha < PS < 70-LPn \times \alpha \ldots (5)$.

13. The projection lens according to claim 12, wherein PS satisfies Conditional Expression (5-1), $40-2.5 \times Ln \times \alpha < PS < 60-1.5 \times Ln \times \alpha \ldots (5\text{-}1)$.

14. A projection apparatus comprising the projection lens according to claim 12.

15. A projection lens having an optical system comprising:
an incidence lens on which light from an electrooptic element is incident; and
an emission lens that is positioned closest to a magnification side and emits an image toward a projection surface,
wherein an incidence optical axis of the incidence lens is shifted in a first direction orthogonal to the incidence optical axis with respect to a center of a screen of the electrooptic element, and
assuming that
a length of the screen of the electrooptic element in the first direction is V1,
a maximum amount of shift of the incidence optical axis with respect to a center position of the screen is V2,
a projection distance between the emission lens and the projection surface is LP,
a dimensionless value of LP is LPn, and
a tilt angle of an emission optical axis of the emission lens with respect to a horizontal direction is α in a case where the emission lens is seen in a side view,
a value of PS defined by Expression (4) satisfies Conditional Expression (5), $PS=100 \times V2/V1 \ldots (4)$, and $35-3.5 \times LPn \times \alpha < PS < 70-LPn \times \alpha \ldots (5)$.

16. The projection lens according to claim 15, wherein PS satisfies Conditional Expression (5-1), $40-2.5 \times Ln \times \alpha < PS < 60-1.5 \times Ln \times \alpha \ldots (5\text{-}1)$.

* * * * *